United States Patent
Yamada

(10) Patent No.: US 9,432,158 B2
(45) Date of Patent: Aug. 30, 2016

(54) SYSTEMS AND METHODS FOR HANDLING A TYPE-2 CARRIER

(71) Applicant: Sharp Laboratories of America, Inc., Camas, WA (US)

(72) Inventor: Shohei Yamada, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 261 days.

(21) Appl. No.: 13/662,126

(22) Filed: Oct. 26, 2012

(65) Prior Publication Data
US 2014/0119207 A1    May 1, 2014

(51) Int. Cl.
G01R 31/08    (2006.01)
H04L 5/00     (2006.01)

(52) U.S. Cl.
CPC ........... *H04L 5/0035* (2013.01); *H04L 5/0085* (2013.01); *H04L 5/0092* (2013.01); *H04L 5/001* (2013.01); *H04L 5/005* (2013.01); *H04L 5/0023* (2013.01)

(58) Field of Classification Search
USPC .......................... 370/252, 328, 338, 350, 401
See application file for complete search history.

(56) References Cited

U.S. PATENT DOCUMENTS

| | | | | |
|---|---|---|---|---|
| 2011/0312316 A1* | 12/2011 | Baldemair et al. | ........ | 455/422.1 |
| 2012/0252432 A1* | 10/2012 | Henttonen | ................ | 455/422.1 |
| 2013/0003668 A1* | 1/2013 | Xiao et al. | .................... | 370/329 |
| 2013/0039331 A1* | 2/2013 | Koorapaty et al. | ........... | 370/330 |
| 2014/0092758 A1* | 4/2014 | Suzuki et al. | ................ | 370/252 |
| 2014/0112243 A1* | 4/2014 | Suzuki et al. | ................ | 370/328 |

FOREIGN PATENT DOCUMENTS

| | | |
|---|---|---|
| WO | 2007/038358 | 4/2007 |
| WO | 2011/055321 | 5/2011 |

OTHER PUBLICATIONS

3GPP TS 36.211 V9.0.0, Evolved Universal Terrestrial Radio Access (E-UTRA); Physical Channels and Modulation (Release 9), Dec. 2009.
3GPP TS 36.212 V9.0.0, Evolved Universal Terrestrial Radio Access (E-UTRA); Multiplexing and channel coding (Release 9), Dec. 2009.
3GPP TS 36.213 V8.6.0, Evolved Universal Terrestrial Radio Access (E-UTRA); Physical layer procedures (Release 8), Mar. 2009.

(Continued)

*Primary Examiner* — Ricky Ngo
*Assistant Examiner* — Christine Ng
(74) *Attorney, Agent, or Firm* — Austin Rapp & Hardman

(57) ABSTRACT

A User Equipment (UE) for handling a type-2 carrier is described. The UE includes a processor and memory in electronic communication with the processor. The instructions stored in the memory are executable to apply a configuration with one or more serving cells including at least one type-2 secondary cell (SCell). The instructions stored in the memory are also executable to obtain a measurement for each of the one or more serving cells except for the at least one type-2 SCell. The instructions stored in the memory are further executable to set a measurement list to include the measurement for each of the one or more serving cells except for the at least one type-2 SCell. The instructions stored in the memory are additionally executable to send the measurement list.

4 Claims, 16 Drawing Sheets

(56) References Cited

OTHER PUBLICATIONS

3GPP TS 36.300 V8.5.0, Evolved Universal Terrestrial Radio Access (E-UTRA) and Evolved Universal Terrestrial Radio Access Network (E-UTRAN) (Release 8) May 2008.

3GPP TS 36.321 V8.0.0, Evolved Universal Terrestrial Radio Access (E-UTRA) Medium Access Control (MAC) protocol specification (Release 8) Dec. 2007.

3GPP TS 36.331 V9.1.0, Evolved Universal Terrestrial Radio Access (E-UTRA) Radio Resource Control (RRC); Protocol specification (Release 9) Dec. 2009.

R1-122375, "Further Views on Synchronized New Carrier Type Scenarios," NTT DOCOMO, May 21-25, 2012, Prague, Czech Republic.

LG Electronics, "Discussion on Synchronized New Carrier," 3GPP TSG RAN WG1 #68bis, R1-121424, Mar. 2012.

LG Electronics, "Discussion on Synchronized New Carrier Type," 3GPP TSG RAN WG1 Meeting #69, R1-122276, May 2012.

3GPP TS 36.331 V11.1.0, "Evolved Universal Terrestrial Radio Access (E-UTRA) Radio Resource Control (RRC); Protocol specification (Release 11)," Sep. 2012.

Alcatel-Lucent, Alcatel-Lucent Shanghai Bell, "On Synchronized New Carriers," 3GPP TSG RAN WG1 Meeting #69, R1-122470, May 2012.

International Search Report issued for International Application No. PCT/JP2013/005889 on Dec. 24, 2013.

LG Electronics, "Discussion on synchronized new carrier", R1-121424, 3rd Generation Partnership Project (3GPP), TSG RAN WG1 #68bis, Jeju, Korea, Mar. 20, 2012.

InterDigital Communications, "Downlink Pathloss Reference and RLM for SCells of a Secondary TA Group", R2-116110, 3rd Generation Partnership Project (3GPP), TSG-RAN WG2 #76, San Francisco, CA, USA, Nov. 8, 2011.

Alcatel-Lucent, Alcatel-Lucent Shanghai Bell, "Pathloss reference for SCell TA group and need of RLM", R2-121688, 3rd Generation Partnership Project (3GPP), TSG-RAN WG2 #77bis, Jeju, USA, Mar. 19, 2012.

\* cited by examiner

SYSTEMS AND METHODS FOR HANDLING A TYPE-2 CARRIER

TECHNICAL FIELD

The present disclosure relates generally to communication systems. More specifically, the present disclosure relates to systems and methods for handling a type-2 carrier.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
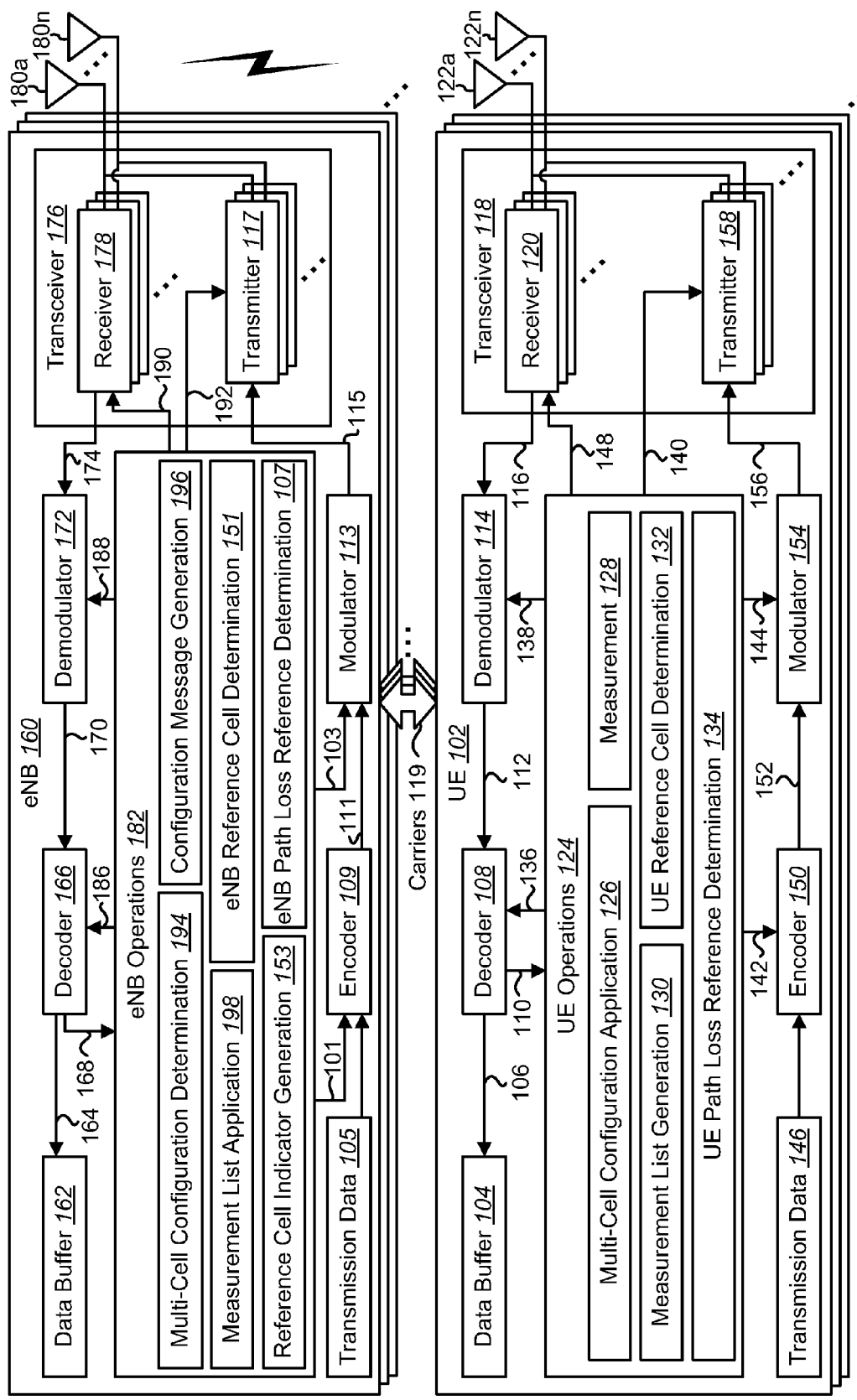
FIG. 1 is a block diagram illustrating one configuration of one or more evolved Node Bs (eNBs) and one or more User Equipments (UEs) in which systems and methods for handling a type-2 carrier may be implemented.

A UE for handling a type-2 carrier is described. The UE includes a processor and memory in electronic communication with the processor. Executable instructions are stored in the memory. The UE applies a configuration with one or more serving cells including at least one type-2 secondary cell (SCell). The UE also obtains a measurement for each of the one or more serving cells except for the at least one type-2 SCell. The UE further sets a measurement list to include the measurement for each of the one or more serving cells except for the at least one type-2 SCell. The UE additionally sends the measurement list.

The UE may determine a reference cell corresponding to the at least one type-2 SCell. Determining the reference cell may include receiving a reference cell indicator.

The UE may utilize at least one of a Cell-Specific Reference Signal (CRS), a Primary Synchronization Signal (PSS) and a Secondary Synchronization Signal (SSS) of the reference cell for the at least one type-2 SCell. A type-2 carrier of the type-2 SCell may not include a CRS, a PSS or an SSS.

The UE may determine a path loss reference for an uplink of the at least one type-2 SCell. Determining the path loss reference may include setting a reference cell corresponding to the at least one type-2 SCell as the path loss reference for the uplink of the at least one type-2 SCell. Determining the path loss reference may include determining whether to set a primary cell (PCell) or a secondary cell (SCell) as the path loss reference for the uplink of the at least one type-2 SCell. Determining the path loss reference may include determining whether to set a primary cell (PCell) or a reference cell corresponding to the at least one type-2 SCell as the path loss reference for the uplink of the at least one type-2 SCell.

The measurement list may be a measResultFreqList. The measurement may include at least one of a Reference Signal Received Power (RSRP) measurement and a Reference Signal Received Quality (RSRQ) measurement.

An evolved Node B (eNB) for handling a type-2 carrier is also described. The eNB includes a processor and memory in electronic communication with the processor. Executable instructions are stored in the memory. The eNB determines a configuration with one or more serving cells including at least one type-2 SCell. The eNB also sends a configuration message based on the configuration. The eNB further receives a measurement list including a measurement for each of the one or more serving cells except for the at least one type-2 SCell.

The eNB may determine at least one reference cell corresponding to the at least one type-2 SCell. The eNB may also send a reference cell indicator.

The eNB may determine a path loss reference for an uplink of the at least one type-2 SCell. The eNB may send a path loss reference indicator.

A method for handling a type-2 carrier by a UE is also described. The method includes applying a configuration with one or more serving cells including at least one type-2 SCell. The method also includes obtaining a measurement for each of the one or more serving cells except for the at least one type-2 SCell. The method further includes setting a measurement list to include the measurement for each of the one or more serving cells except for the at least one type-2 SCell. The method additionally includes sending the measurement list.

A method for handling a type-2 carrier by an eNB is also described. The eNB includes determining a configuration with one or more serving cells including at least one type-2 SCell. The method also includes sending a configuration message based on the configuration. The method additionally includes receiving a measurement list including a measurement for each of the one or more serving cells except for the at least one type-2 SCell.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a Physical Downlink Shared Channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics. For convenience, some acronyms and abbreviations may be used herein as follows: Radio Access Technology (RAT), Resource Block (RB), Medium Access Control (MAC), Information Element (IE), Radio Resource Management (RRM), Radio Resource Control (RRC), primary cell (PCell), secondary cell (SCell), Reference Signal Received Power (RSRP) and Reference Signal Received Quality (RSRQ).

When carrier aggregation is configured, a UE may have only one radio resource control (RRC) connection with the network. A primary cell (PCell) is a serving cell, operating on the primary frequency, in which the UE either performs the initial connection establishment procedure or initiates the connection re-establishment procedure, or is the cell indicated as the primary cell in the handover procedure. The PCell provides the non-access stratum (NAS) mobility information (e.g., Tracking Area Identity (TAI)) and the security input. A secondary cell (SCell) is a cell, operating on a secondary frequency, which may be configured once an RRC connection is established and which may be used to provide additional radio resources.

In the downlink, the component carrier (CC) corresponding to the PCell is the downlink primary component carrier (DL PCC). In the uplink, the CC corresponding to the PCell is the uplink primary component carrier (UL PCC). Depending on the capabilities of the UE, one or more SCells may be configured to form a set of serving cells with the PCell. In the downlink, the CC corresponding to the secondary cell (SCell) is the downlink secondary component carrier (DL SCC). In the uplink, the CC corresponding to the secondary cell (SCell) is the uplink secondary component carrier (UL SCC). The number of downlink CCs may be different from the number of uplink CCs because multiple cells may share one uplink CC.

If carrier aggregation is configured, a UE may have multiple serving cells: a PCell and one or more SCells. From a network perspective, a serving cell may be used as the PCell by one UE and used as an SCell by another UE. If carrier aggregation is not configured, a PCell operates a single serving cell. There may be one or more SCells in addition to the PCell if carrier aggregation is configured. One benefit of using carrier aggregation is that additional downlink and/or uplink data may be transmitted. As a result of the additional downlink data, additional uplink control information (UCI) may be needed.

Anticipated Release-11 specifications may introduce an additional carrier type. The additional carrier type (referred to as a type-2 carrier) has no CRS (cell-specific reference signal), no PSS (primary synchronization signal) and no SSS (secondary synchronization signal). If a UE is configured with carrier aggregation and a type-2 carrier is included in carriers of configured serving cells, a UE may use a serving cell of a legacy type carrier (referred to as a type-1 carrier) to synchronize a serving cell of a type-2 carrier, assuming that those two serving cells are synchronized. In other words, a type-2 carrier may be synchronized with a type-1 carrier. The legacy carrier type has PSS, SSS and CRS (normally, every subframe (1 millisecond (ms)) has CRS, for example).

There is another carrier type (referred as a type-3 carrier), which has PSS and SSS and may or may not have reduced CRS (periodicity of the CRS may be reduced from 1 ms to 5 ms and bandwidth of the CRS may be reduced, for example). A UE can achieve synchronization with a type-3 carrier by using PSS and SSS of a cell with the type-3 carrier.

In anticipated Release-12 specifications, this type-2 carrier and type-3 carrier may be introduced. A serving cell with a type-1 carrier, a serving cell with a type-2 carrier and a serving cell with a type-3 carrier may be referred to herein as a type-1 serving cell, a type-2 serving cell and a type-3 serving cell, respectively. A PCell with a type-1 carrier and a PCell with a type-3 carrier may be referred herein as a type-1 PCell and a type-3 PCell, respectively. An SCell with type-1 carrier, an SCell with type-2 carrier and an SCell with type-3 carrier may be referred to herein as a type-1 SCell, a type-2 SCell and a type-3 SCell, respectively. A type-2 carrier may not be used for a PCell.

In accordance with anticipated Release-11 specifications, a UE may, whenever the UE has a measConfig, perform RSRP and RSRQ measurements for each serving cell. For the measId for which the measurement reporting procedure was triggered, the UE may set the measResults within a MeasurementReport message as follows. The UE may set the measResultServFreqList to include for each SCell that is configured, if any, within measResultSCell the quantities of the concerned SCell. However, measurement for a type-2 carrier may not be performed and measurement results for a type-2 carrier may not be included in the measurement results.

In anticipated Release-11 specifications, a path loss reference for the uplink of a serving cell is specified by UE specific RRC dedicated signaling. Furthermore, pathlossReferenceLinking may indicate whether the UE shall apply as path loss reference either the downlink of the PCell or of the SCell that corresponds with this uplink. For SCells that are part of a secondary TAG (Timing Advance Group), the E-UTRAN sets the value to sCell (e.g., the downlink of the SCell that corresponds with this uplink). However, a type-2 carrier cannot be the path loss reference because a type-2 carrier does not have a CRS.

The UE may need to have different procedures for RRM measurement for a type-1 carrier and for a type-2 carrier. Some configurations of the systems and methods disclosed herein describe how to report measurement results for a type-2 SCell. The UE may need to have different procedures for a reference cell for a type-1 carrier and for a type-2 carrier. Some configurations of the systems and methods disclosed herein describe how to configure a reference cell for a type-2 SCell.

In particular, some configurations of the systems and methods disclosed herein describe type-2 carrier measurement handling. A UE may perform one or more of RSRP measurement and RSRQ measurement for each serving cell, except for a type-2 serving cell. The UE may set a measResultPCell to include the quantities of the PCell. The UE may set a measResultServFreqList to include, within measResultSCell, the quantities of the concerned SCell for each SCell that is configured and is not a type-2 SCell, if any. The UE may send the results of RSRP and RSRQ measurement for each serving cell, except for a type-2 serving cell. An eNB may include carrier frequencies, except for a type-2 carrier, in a measurement configuration. One benefit of the systems and methods disclosed herein is that a UE and an eNB can handle an additional carrier type efficiently.

Some configurations of the systems and methods disclosed herein describe type-2 carrier reference handling. In particular, a reference cell may be configured for a type-2 SCell as follows. An eNB may configure a UE with a type-2 SCell and a reference cell that corresponds to the type-2 SCell. The UE may use one or more of CRS, PSS and SSS of the reference cell for the type-2 SCell.

In a first approach, a UE configured with a type-2 SCell may use, as a path loss reference for the uplink of the type-2 SCell, the reference cell that corresponds to the type-2 SCell. In a second approach, a PCell or an SCell may be configured as a path loss reference for the uplink of a type-2 SCell for a UE configured with a type-2 SCell. If the SCell is configured as a path loss reference for the uplink of the type-2 SCell, the UE may use the reference cell of the type-2 SCell as the path loss reference. If the PCell is configured as a path loss reference for the uplink of the type-2 SCell, the UE may use the PCell of the type-2 SCell as the path loss reference. In a third approach, a PCell or the reference cell that corresponds with a type-2 SCell may be configured as a path loss reference for the uplink of the type-2 SCell for a UE configured with a type-2 SCell.

In some implementations, a reference cell for the type-2 SCell is a PCell. In this case, the eNB configures the UE with type-2 SCell(s). Furthermore, the UE may use one or more of the CRS, PSS, SSS and path loss of the PCell for the type-2 SCell(s). One benefit of the systems and methods disclosed herein is that the UE and the eNB can handle an additional carrier type efficiently.

For clarity and context, the following section includes portions of the 3GPP TS 36.331 specification interspersed with explanation. More detail regarding RRM measurement is given as follows. RRM measurement may be defined mainly for the purpose of inter-cell mobility management in the RRC layer. The UE reports measurement information in accordance with the measurement configuration as provided by E-UTRAN (e.g., serving eNB, neighbour eNB, network, etc.). E-UTRAN provides the measurement configuration (MeasConfig) applicable for a UE in RRC_CONNECTED by means of dedicated signalling, i.e. using the RRCConnectionReconfiguration message.

The UE can be requested to perform the following types of measurements:

Intra-frequency measurements: measurements at the downlink carrier frequency(ies) of the serving cell(s).

Inter-frequency measurements: measurements at frequencies that differ from any of the downlink carrier frequency(ies) of the serving cell(s).

Inter-RAT measurements

The measurement configuration includes the following parameters:

1. Measurement objects: The objects on which the UE shall perform the measurements.

For intra-frequency and inter-frequency measurements a measurement object is a single E-UTRA carrier frequency. Associated with this carrier frequency, E-UTRAN can configure a list of cell specific offsets and a list of 'blacklisted' cells. Blacklisted cells are not considered in event evaluation or measurement reporting.

2. Reporting configurations: A list of reporting configurations where each reporting configuration consists of the following:

Reporting criterion: The criterion that triggers the UE to send a measurement report. This can either be periodical or a single event description.

Reporting format: The quantities that the UE includes in the measurement report and associated information (e.g. number of cells to report).

3. Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

4. Quantity configurations: One quantity configuration is configured per RAT type. The quantity configuration defines the measurement quantities and associated filtering used for all event evaluation and related reporting of that measurement type. One filter can be configured per measurement quantity.

5. Measurement gaps: Periods that the UE may use to perform measurements, i.e. no (UL, DL) transmissions are scheduled.

E-UTRAN only configures a single measurement object for a given frequency, i.e. it is not possible to configure two or more measurement objects for the same frequency with different associated parameters, e.g. different offsets and/or blacklists E-UTRAN may configure multiple instances of the same event e.g. by configuring two reporting configurations with different thresholds.

The UE maintains a single measurement object list, a single reporting configuration list, and a single measurement identities list. The measurement object list includes measurement objects, that are specified per RAT type, possibly including intra-frequency object(s) (i.e. the object(s) corresponding to the serving frequency(ies)), inter-frequency object(s) and inter-RAT objects. Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The serving cell(s)—these are the PCell and one or more SCells, if configured for a UE supporting CA.

2. Listed cells—these are cells listed within the measurement object(s).

3. Detected cells—these are cells that are not listed within the measurement object(s) but are detected by the UE on the carrier frequency(ies) indicated by the measurement object(s).

For E-UTRA, the UE measures and reports on the serving cell(s), listed cells and detected cells. The UE shall be able to identify new intra-frequency cells and perform RSRP measurements of identified intra-frequency cells without an explicit intra-frequency neighbour cell list containing physical layer cell identities. During the RRC_CONNECTED state the UE shall continuously measure identified intra frequency cells and additionally search for and identify new intra frequency cells. The UE shall be able to identify new inter-frequency cells and perform RSRP measurements of identified inter-frequency cells if carrier frequency information is provided by the PCell, even if no explicit neighbour list with physical layer cell identities is provided.

For all measurements the UE applies the layer 3 filtering, before using the measured results for evaluation of reporting criteria or for measurement reporting. The UE shall, whenever the UE has a measConfig, perform RSRP and RSRQ measurements for each serving cell.

The UE shall, if a measurement gap configuration is setup; or if the UE does not require measurement gaps to perform the concerned measurements: if s-Measure is not configured; or if s-Measure is configured and the PCell RSRP, after layer 3 filtering, is lower than this value: perform the corresponding measurements of neighbouring cells on the frequencies and RATs indicated in the concerned measObject.

In RRM measurement, RSRP and RSRQ are measured for CRS (Cell-specific Reference Signal). For the measId for which the measurement reporting procedure was triggered, the UE shall set the measResults within the MeasurementReport message and submit the MeasurementReport message to lower layers for transmission to transfer measurement results from the UE to E-UTRAN.

The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration.

The IE MeasConfig specifies measurements to be performed by the UE, and covers intra-frequency, inter-frequency and inter-RAT mobility as well as configuration of measurement gaps. The IE MeasId is used to identify a measurement configuration, i.e., linking of a measurement object and a reporting configuration.

The IE MeasIdToAddModList concerns a list of measurement identities to add or modify, with for each entry the measId, the associated measObjectId and the associated reportConfigId. The IE MeasObjectToAddModList concerns a list of measurement objects to add or modify. This can link measObjectId and measObject.

The IE MeasObjectEUTRA specifies information applicable for intra-frequency or inter-frequency E-UTRA cells. The IE ReportConfigEUTRA specifies criteria for triggering of an E-UTRA measurement reporting event. Trigger type can be set to event trigger or periodic trigger. The E-UTRA measurement reporting events are labelled AN with N equal to 1, 2 and so on.

Event A1: Serving becomes better than absolute threshold;

Event A2: Serving becomes worse than absolute threshold;

Event A3: Neighbour becomes amount of offset better than PCell;

Event A4: Neighbour becomes better than absolute threshold;

Event A5: PCell becomes worse than absolute threshold1 AND Neighbour becomes better than another absolute threshold2.

Event A6: Neighbour becomes amount of offset better than SCell.

The IE ReportConfigId is used to identify a measurement reporting configuration. The IE MeasResults covers measured results for intra-frequency, inter-frequency and inter-RAT mobility. MeasResults includes measId and measurement results of PCell, optionally neighbor cell and SCell(s).

UE and eNB maintains the following variables (i.e. VarMeasConfig and VarMeasReportList) to operate measurement. The variables are illustrated in Listing (1) as follows.

The UE variable VarMeasConfig includes the accumulated configuration of the measurements to be performed by the UE, covering intra-frequency, inter-frequency and inter-RAT mobility related measurements. The UE variable VarMeasReportList includes information about the measurements for which the triggering conditions have been met. Accordingly, the 3GPP TS 36.331 provides context in which some configurations of the systems and methods disclosed herein may be utilized.

More detail regarding some configurations of the systems and methods disclosed herein is given as follows. Some implementations of the systems and methods disclosed herein enable type-2 carrier measurement handling. An eNB may include carrier frequencies except for a type-2 carrier in a measurement configuration. A UE performs RSRP and RSRQ measurement for each serving cell except for a type-2 serving cell. The UE sets a measResultPCell to include the quantities (e.g., RSRP and RSRQ) of the PCell. The UE sets Listing (1)

```
-- ASN1START
MeasResults ::=             SEQUENCE {
    measId                      MeasId,
    measResultPCell             SEQUENCE {
        rsrpResult                  RSRP-Range,
        rsrqResult                  RSRQ-Range
    },
    measResultNeighCells        CHOICE {
        measResultListEUTRA         MeasResultListEUTRA,
        measResultListUTRA          MeasResultListUTRA,
        measResultListGERAN         MeasResultListGERAN,
        measResultsCDMA2000         MeasResultsCDMA2000,
        ...
    }                                                       OPTIONAL,
    ...,
    [[  measResultForECID-r9       MeasResultForECID-r9     OPTIONAL
    ]],
    [[ locationInfo-r10            LocationInfo-r10         OPTIONAL,
        measResultServFreqList-r10  MeasResultServFreqList-r10  OPTIONAL
    ]]
}
MeasResultListEUTRA ::=     SEQUENCE (SIZE (1..maxCellReport)) OF
MeasResultEUTRA
MeasResultEUTRA ::=         SEQUENCE {
    physCellId                  PhysCellId,
    cgi-Info                    SEQUENCE {
        cellGlobalId                CellGlobalIdEUTRA,
        trackingAreaCode            TrackingAreaCode,
        plmn-IdentityList           PLMN-IdentityList2       OPTIONAL
    }                                                        OPTIONAL,
    measResult                  SEQUENCE {
        rsrpResult                  RSRP-Range              OPTIONAL,
        rsrqResult                  RSRQ-Range              OPTIONAL,
        ...,
        [[  additionalSI-Info-r9    AdditionalSI-Info-r9    OPTIONAL
        ]]
    }
}
MeasResultServFreqList-r10 ::=  SEQUENCE (SIZE (1..maxServCell-r10)) OF
MeasResultServFreq-r10
MeasResultServFreq-r10 ::=  SEQUENCE {
    servFreqId-r10              ServCellIndex-r10,
    measResultSCell-r10         SEQUENCE {
        rsrpResultSCell-r10         RSRP-Range,
        rsrqResultSCell-r10         RSRQ-Range
    }                                                       OPTIONAL,
    measResultBestNeighCell-r10 SEQUENCE {
        physCellId-r10              PhysCellId,
        rsrpResultNCell-r10         RSRP-Range,
        rsrqResultNCell-r10         RSRQ-Range
    }                                                       OPTIONAL,
    ...
}
-- ASN1STOP
``` the measResultServFreqList to include the quantities of the concerned SCell within measResultSCell, for each SCell that is configured and isn't a type-2 SCell, if any.

In Release-11 specifications, whenever the UE has a measConfig, the UE performs RSRP and RSRQ measurements for each serving cell. For the measId for which the measurement reporting procedure was triggered, the UE sets the measResults within the MeasurementReport message as follows. The UE sets the measResultServFreqList to include the quantities of a concerned SCell within measResultSCell for each SCell that is configured, if any. The quantities to be included in the measurement report are the RSRP and RSRQ quantities. However, measurement for a type-2 carrier cannot be performed and measurement results for type-2 carrier should not be included in the measurement results.

In Release-12 specifications, the eNB may configure a UE with multiple serving cells, including a type-2 serving cell. The eNB includes carrier frequencies except for a type-2 carrier in a measurement configuration (measConfig), even if the eNB configures the UE with multiple serving cells including a type-2 serving cell. The measurement configuration is informed to the UE (by the eNB, for example). Whenever the UE has a measConfig, the UE performs RSRP and RSRQ measurements for each serving cell, except for a type-2 serving cell. In some configurations, RSRP and RSRQ measurements for a serving cell are CRS-based measurements. Additionally or alternatively, a UE may perform RSRP and RSRQ measurements for channel state information reference signal(s) (CSI-RS(s)) for each serving cell. A type-1 serving cell, a type-2 serving cell and a type-3 serving cell may be configured with CSI-RS(s). For the measId for which the measurement reporting procedure was triggered, the UE sets the measResults within the MeasurementReport message as follows. The UE may set a measResultPCell to include the quantities of the PCell. The UE sets the measResultServFreqList to include the quantities of the concerned SCell within measResultSCell for each SCell that is configured and isn't type-2, if any. The UE may set the measResultServFreqList to include the quantities of CSI-RS(s) of the concerned SCell within measResultSCell for each SCell, even if the SCell is type-2. One benefit of the systems and methods disclosed herein is that a UE and an eNB can handle an additional carrier type efficiently.

Some implementations of the systems and methods disclosed herein enable type-2 carrier reference handling. In particular, a reference cell may be configured for a type-2 SCell as follows. An eNB may configure a UE with a type-2 SCell and a reference cell that corresponds to the type-2 SCell. The UE may use one or more of CRS, PSS and SSS of the reference cell for the type-2 SCell.

In a first approach, a UE configured with a type-2 SCell may use, as a path loss reference for the uplink of the type-2 SCell, the reference cell that corresponds to the type-2 SCell. In a second approach, a PCell or an SCell may be configured as a path loss reference for the uplink of a type-2 SCell for a UE configured with a type-2 SCell. If the SCell is configured as a path loss reference for the uplink of the type-2 SCell, the UE may use the reference cell of the type-2 SCell as the path loss reference. If the PCell is configured as a path loss reference for the uplink of the type-2 SCell, the UE may use the PCell of the type-2 SCell as the path loss reference. In a third approach, a PCell or the reference cell that corresponds with a type-2 SCell may be configured as a path loss reference for the uplink of the type-2 SCell for a UE configured with a type-2 SCell.

In some implementations, a reference cell for the type-2 SCell is a PCell. In this case, the eNB configures the UE with type-2 SCell(s). Furthermore, the UE may use one or more of the CRS, PSS, SSS and path loss of the PCell for the type-2 SCell(s).

In Release-11 specifications, CRS, PSS and SSS exist in a type-1 serving cell. Therefore, there is no need to have a reference cell for a type-1 or a type-3 serving cell. A path loss reference for uplink of a serving cell is specified by UE specific RRC dedicated signaling. A pathlossReferenceLinking indicates whether the UE shall apply as path loss reference either the downlink of the PCell or of the SCell that corresponds with this uplink. For SCells part of a secondary TAG, the E-UTRAN sets the value to sCell (e.g., the downlink of the SCell that corresponds with this uplink). However, a type-2 carrier cannot be the path loss reference because a type-2 carrier does not have a CRS. Listing (2) illustrates one example of pathlossReferenceLinking as follows.

Listing (2)

```
UplinkPowerControlDedicatedSCell-r10 ::=   SEQUENCE {
    pathlossReferenceLinking-r10           ENUMERATED {pCell,
                                                       sCell}
}
```

More detail regarding how a reference cell may be configured for a type-2 SCell is given as follows. In Release-12 specifications, an eNB may configure a UE with multiple serving cells, including a type-2 serving cell. When the eNB configures a UE with a type-2 SCell, the eNB may also configure the UE with a serving cell index for the type-2 SCell. The serving cell corresponding to the serving cell index may be used as a reference cell for the type-2 SCell. One or more of the CRS, PSS and SSS of the reference cell may be referred by the type-2 SCell. A type-1 or a type-3 serving cell, but not a type-2 cell, can be a reference cell. When the UE receives the type-2 SCell configuration, including a serving cell index for the reference cell, the UE may use at least one of the CRS, PSS and SSS of the reference cell for the type-2 SCell.

Regarding a path loss reference for the uplink of the type-2 SCell, one or more approaches may be applied in accordance with the systems and methods disclosed herein. In a first approach, a UE configured with type-2 SCell may use the reference cell that corresponds with the type-2 SCell as a path loss reference for the uplink of the type-2 SCell. In a second approach, a PCell or an SCell may be configured as a path loss reference for the uplink of a type-2 SCell for a UE configured with a type-2 SCell. If the SCell is configured as a path loss reference for the uplink of the type-2 SCell, the UE may use the reference cell of the type-2 SCell as the path loss reference. If the PCell is configured as a path loss reference for the uplink of the type-2 SCell, the UE may use the PCell of the type-2 SCell as the path loss reference. In a third approach, a PCell or the reference cell that corresponds with a type-2 SCell may be configured as a path loss reference for the uplink of the type-2 SCell for a UE configured with a type-2 SCell.

A pathlossReferenceLinking-r10 may indicate whether the UE applies, as a path loss reference, either the downlink of the PCell or of the type-1 SCell that corresponds with this uplink. For type-1 SCells part of a secondary TAG, the E-UTRAN sets the value to sCell (e.g., the downlink of the SCell that corresponds with this uplink).

In the first approach, pathlossReferenceLinking-r10 may not be signaled to the UE or may be ignored by the UE. A UE configured with type-2 SCell may use the reference cell that corresponds with the type-2 SCell as a path loss reference for the uplink of the type-2 SCell.

In the second approach, pathlossReferenceLinking-r10 may be signaled to the UE. If the SCell is indicated as a path loss reference for the uplink of the type-2 SCell, the UE may use the reference cell of the type-2 SCell as the path loss reference. If the PCell is indicated as a path loss reference for the uplink of the type-2 SCell, the UE may use the PCell of the type-2 SCell as the path loss reference.

In the third approach, pathlossReferenceLinking-r11 may be signaled to the UE. pathlossRerefenceLinking-r11 may indicate whether the UE applies, as a path loss reference, either the downlink of the PCell or of the reference cell of the type-2 SCell that corresponds with this uplink.

In some implementations, a reference cell for the type-2 SCell is a PCell. In Release-12, the eNB may configure the UE with multiple serving cells, including a type-2 serving cell. When the eNB configures the UE with a type-2 SCell, the eNB may assume that a UE uses a PCell as a reference cell for the type-2 SCell. Furthermore, the UE may use one or more of the CRS, PSS, SSS and path loss of the reference cell for the type-2 SCell. One benefit of the systems and methods disclosed herein is that a UE and an eNB can handle an additional carrier type efficiently.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for handling a type-2 carrier may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use multiple carriers 119 to communicate with each other. Each of the carriers 119 may be utilized to transmit downlink (e.g., from an eNB 160 to a UE 102) information, to transmit uplink (e.g., from a UE 102 to an eNB 160) information or both. In particular, each carrier 119 may be a frequency band allocated for communication. In some configurations, multiple carriers 119 may be aggregated or grouped to provide expanded communication bandwidth between an eNB 160 and a UE 102. Each of the carriers 119 may correspond to a cell. For example, one or more carriers 119 may be provided with each serving cell. Each of the serving cells may be a PCell or an SCell as described above.

Each of the carriers 119 may have a particular carrier type. For instance, each of the carriers 119 may be a type-1 carrier, a type-2 carrier or a type-3 carrier as described above. Specifically, a type-2 carrier may not have a CRS, a PSS or an SSS. However, a type-1 carrier may have one or more of a CRS, a PSS and SSS. Furthermore, an SCell with a type-2 carrier may be referred to as type-2 SCell in accordance with the above description.

It should be noted that a UE 102 may transmit information or data to the eNB 160 using one or more uplink channels. Examples of uplink channels include a Physical Uplink Control Channel (PUCCH) and a Physical Uplink Control Channel (PUSCH), etc. Furthermore, the one or more eNBs 160 may also transmit information or data to the one or more UEs 102 using one or more downlink channels, for instance. Examples of downlink channels include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware (e.g., circuitry). For example, the UE operations module 124 may be implemented in hardware, software or a combination of both.

In general, the UE operations module 124 may enable the UE 102 to communicate with the one or more eNBs 160. The UE operations module 124 may include one or more of a multi-cell configuration application module 126, a measurement module 128, a measurement list generation module 130, a UE reference cell determination module 132 and a UE path loss reference determination module 134.

The multi-cell configuration application module 126 may apply a configuration with one or more serving cells including at least one type-2 SCell. For example, the UE 102 may receive a configuration message from an eNB 160 that indicates a configuration of multiple serving cells. In some implementations, the multi-cell configuration application module 126 may apply the configuration by designating particular carriers for communication and updating UE settings (e.g., hardware and/or software settings) to enable transmission and/or reception on the designated carriers. At least one of the serving cells may be a type-2 SCell. In particular, the type-2 SCell may have a type-2 carrier.

The measurement module 128 may obtain a measurement for each of the one or more serving cells except for the at least one type-2 SCell. For example, the measurement module 128 may perform RSRP and RSRQ measurements for each serving cell, except for a type-2 SCell. For instance, if there are two serving cells and one is a type-1 serving cell and the other is a type-2 serving cell, measurement may be performed only for the type-1 serving cell. In some implementations, obtaining a measurement may be triggered by a measurement configuration (e.g., measConfig) in accordance with the above description. For instance, a UE 102 may receive a measConfig from an eNB 160 that directs the UE 102 to take measurements for one or more serving cells, except for the at least one type-2 SCell. The measurement module 128 may then obtain RSRP and RSRQ measurements corresponding to each of the serving cells, except for the at least one type-2 SCell. Some implementations of the systems and methods disclosed herein may be performed in accordance with the procedures described above regarding measurements.

The measurement list generation module 130 may generate a measurement list. The measurement list generation module 130 may also set the measurement list to include the measurement for each of the one or more serving cells except for the at least one type-2 SCell. For instance, the measurement list generation module 130 may include the RSRP and RSRQ measurements corresponding to each of the one or more serving cells, except for the at least one type-2 SCell, in a measurement list. In some examples, the measurement list may be a measResultPCell and a measResultServFreqList as described above. Furthermore, the measurement list generation module 130 may include RSRP and RSRQ measurement quantities (e.g., measResult) corresponding to a PCell in a measResultPCell. The measurement list generation module 130 may include RSRP and RSRQ measurement quantities (e.g., measResult) corresponding to any configured SCell, except any type-2 SCell(s), in a measResultSCell in the measResultServFreqList as described above.

The UE 102 may send the measurement list. For example, the UE 102 may transmit the measurement list to an eNB 160 in an uplink message. For instance, the UE 102 may send a measResultPCell that includes RSRP and RSRQ measurement quantities of the PCell and a measResultServFreqList that includes RSRP and RSRQ measurement quantities for each SCell, except for at least one type-2 SCell. In some implementations, the measResultPCell and the measResultServFreqList may be included in a MeasurementReport message.

The UE reference cell determination module 132 may determine a reference cell corresponding to at least one type-2 SCell. For example, determining a reference cell corresponding to the at least one type-2 SCell may include receiving a reference cell indicator (from an eNB 160, for instance). More specifically, a reference cell indicator may indicate a particular reference cell for a type-2 SCell. In some implementations, the reference cell may be designated with a reference cell indicator (e.g., a cell index number). For example, a UE 102 may be configured with multiple serving cells including a type-2 serving cell. When the UE 102 is configured (based on eNB 160 messaging, for example) with a type-2 SCell, the UE 102 may also be configured with a serving cell index for the type-2 SCell. The serving cell corresponding to the serving cell index may be determined by the UE reference cell determination module 132 as the reference cell corresponding to the at least one type-2 SCell.

The UE path loss reference determination module 134 may determine a path loss reference for an uplink of the at least one type-2 SCell. For example, the UE path loss reference determination module 134 may determine the path loss reference in accordance with one or more of the approaches described above. In a first approach, the UE path loss reference determination module 134 determines the path loss reference as the reference cell corresponding to the at least one type-2 SCell. In a second approach, the UE path loss reference determination module 134 determines the path loss reference between a PCell and an SCell. In a third approach, the UE path loss reference determination module 134 determines the path loss reference between a PCell and the reference cell corresponding to the at least one type-2 SCell. In some implementations, determining the path loss reference is based on a received path loss reference indicator (from an eNB 160, for example). More detail is given below.

The UE 102 may utilize 306 at least one of a CRS, PSS and SSS of the reference cell for the at least one type-2 SCell. More detail is given below. Additionally or alternatively, the UE 102 may utilize a path loss corresponding to the path loss reference for the at least one type-2 SCell. As described above, the path loss reference may or may not be the reference cell. More detail is given below.

The UE operations module 124 may provide information 148 to the one or more receivers 120. For example, the UE operations module 124 may inform the receiver(s) 120 of one or more carriers 119 on which to receive signals.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include a measurement list as described herein.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 to transmit on particular carriers 119. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data that may be used by the eNB operations module 182 to perform one or more operations.

In general, the eNB operations module 182 may enable the eNB 160 to communicate with the one or more UEs 102. The eNB operations module 182 may include one or more of a multi-cell configuration determination module 194, configuration message generation module 196, a measurement list application module 198, an eNB reference cell determination module 151, a reference cell indicator generation 153 and an eNB path loss reference determination module 107.

The multi-cell configuration determination module 194 may determine a configuration with one or more serving cells including at least one type-2 SCell. For example, the eNB 160 may generate a configuration for a UE 102 to communicate on multiple carriers 119, where at least one of the multiple carriers 119 is a type-2 carrier provided in an SCell.

The configuration message generation module 196 may generate a configuration message that indicates the configuration determined by the multi-cell configuration determination module 194. The eNB 160 may send the configuration message. Thus, the eNB 160 may generate and send a configuration message indicating the configuration with one or more serving cells including at least one type-2 SCell.

In some implementations, the eNB 160 may generate and send a measConfig. For example, the measConfig may be sent in an RRCConnectionReconfiguration message. The measConfig may direct the UE 102 to obtain a measurement (e.g., RSRP and RSRQ) for one or more serving sells that are not type-2 SCells.

The eNB 160 may receive a measurement list including a measurement for each of the one or more serving cells except for the at least one type-2 SCell. For example, the eNB 160 may receive a MeasurementReport message that includes a measResultPCell and a measResultServFreqList that include RSRP and RSRQ quantities for one or more serving cells, but does not include any measurement regarding a type-2 SCell. In some implementations, the eNB 160 may receive the measurement list (e.g., measResultPCell, measResultServFreqList) as measResults within a MeasurementReport message.

The eNB reference cell determination module 151 may determine a reference cell corresponding to at least one type-2 SCell. For example, the eNB reference cell determination module 151 may select a serving cell that is configured for communication with a UE 102 as a reference cell. The reference cell may be utilized by a UE 102 for operations relating to the at least one type-2 SCell. For example, the reference cell may include one or more of a CRS, PSS and SSS, which the UE 102 may utilize for one or more operations relating to the type-2 SCell.

The reference cell indicator generation module 153 may generate a reference cell indicator. The eNB 160 may send the reference cell indicator. For example, the eNB 160 may generate and send a reference cell indicator that indicates a reference cell to a UE 102. More specifically, a reference cell indicator may indicate a particular reference cell for a type-2 SCell. In some implementations, the reference cell indicator may be a cell index number. For example, a eNB 160 may configure a UE 102 with multiple serving cells including a type-2 serving cell. When the eNB 160 configures a UE 102 (based on eNB 160 messaging, for example) with a type-2 SCell, the eNB 160 may also configure the UE 102 with a serving cell index for the type-2 SCell. The serving cell corresponding to the serving cell index may be the reference cell corresponding to the at least one type-2 SCell.

The eNB path loss reference determination module 107 may optionally determine a path loss reference for an uplink of the least one type-2 SCell. For example, the eNB path loss reference determination module 107 may determine the path loss reference in accordance with one or more of the approaches described above. In a first approach, the path loss reference is the reference cell corresponding to the at least one type-2 SCell. In a second approach, the eNB 160 may select the path loss reference between a PCell and an SCell. In a third approach, the eNB 160 may select the path loss reference between a PCell and the reference cell corresponding to the at least one type-2 SCell.

The eNB 160 may optionally send the path loss reference indicator. In a first approach, the path loss reference may be the reference cell. In this case, the eNB 160 may not send a path loss reference indicator. Optionally, however, the eNB 160 may send a path loss reference indicator that indicates a selected path loss reference. In a second approach, for example, the eNB path loss reference determination module 107 may select a path loss reference between a PCell and an SCell. In this case, the eNB 160 may send a path loss reference indicator indicating whether the path loss reference is a PCell or an SCell. In a third approach, the eNB path loss reference determination module 107 may select a path loss reference between a PCell and the reference cell. In this case, the eNB 160 may send a path loss reference indicator indicating whether the path loss reference is a PCell or the reference cell.

The eNB operations module 182 may provide information 190 to the one or more receivers 178. For example, the eNB operations module 182 may inform the receiver(s) 178 of carriers 119 on which to receive transmissions.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include one or more of a reference cell indicator and a path loss reference indicator.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 of carriers 119 on which to transmit information. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
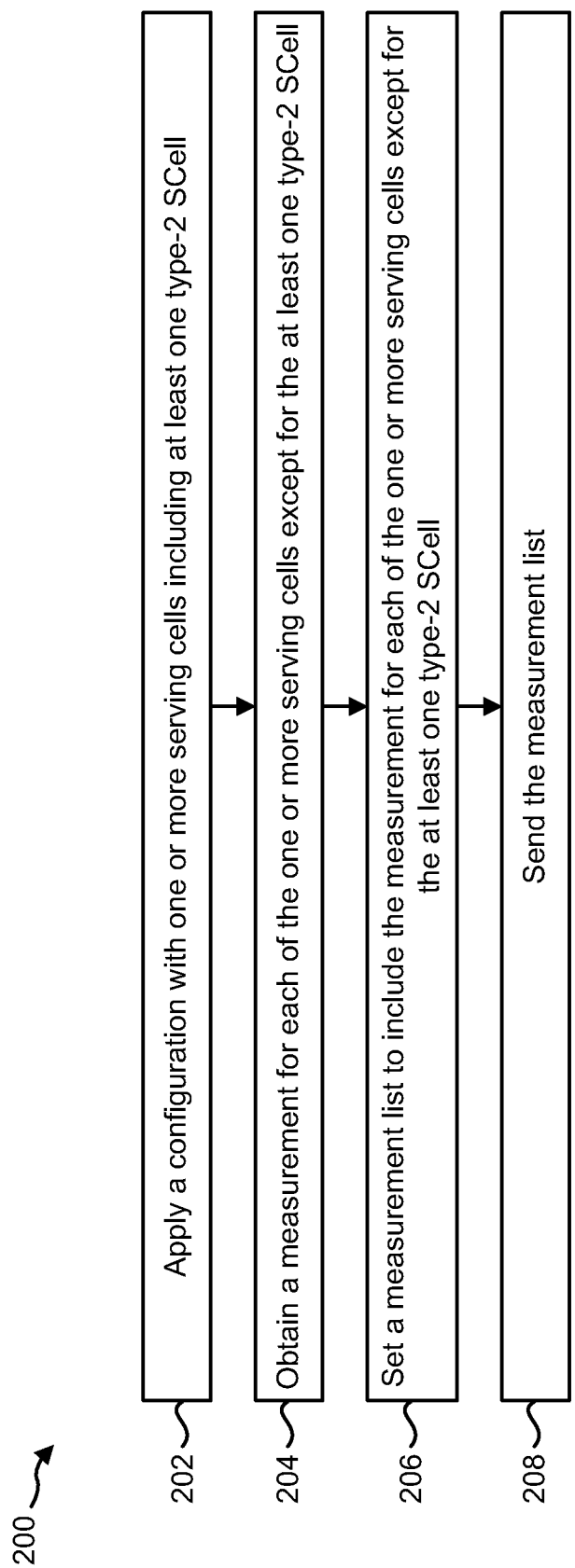
FIG. 2 is a flow diagram illustrating one configuration of a method for handling a type-2 carrier.

FIG. 2 is a flow diagram illustrating one configuration of a method 200 for handling a type-2 carrier. A UE 102 may apply 202 a configuration with one or more serving cells including at least one type-2 SCell. For example, the UE 102 may receive a configuration message from an eNB 160 that indicates a configuration of multiple serving cells. In some implementations, the UE 102 may apply 202 the configuration by designating particular carriers for communication and updating UE settings (e.g., hardware and/or software settings) to enable transmission and/or reception on the designated carriers. At least one of the serving cells may be a type-2 SCell. In particular, the type-2 SCell may have a type-2 carrier.

The UE 102 may obtain 204 a measurement for each of the one or more serving cells except for the at least one type-2 SCell. For example, the UE 102 may perform RSRP and RSRQ measurements for each serving cell, except for a type-2 SCell. In some implementations, obtaining 204 a measurement may be triggered by a measurement configuration (e.g., measConfig) in accordance with the above description. For instance, a UE 102 may receive a measConfig from an eNB 160 that directs the UE 102 to take measurements for one or more serving cells, except for the at least one type-2 SCell. The UE 102 may then obtain RSRP and RSRQ measurements corresponding to each of the serving cells, except for the at least one type-2 SCell. Some implementations of the systems and methods disclosed herein may be performed in accordance with the procedures described above regarding measurements.

The UE 102 may set 206 a measurement list to include the measurement for each of the one or more serving cells except for the at least one type-2 SCell. For instance, the UE 102 may include the RSRP and RSRQ measurements corresponding to one or more of the serving cells, except for the at least one type-2 SCell, in a measurement list. In some examples, the measurement list may be a measResultPCell and a measResultServFreqList as described above. Furthermore, the UE 102 may include RSRP and RSRQ measurement quantities (e.g., measResult) corresponding to a PCell in a measResultPCell. The UE 102 may include RSRP and RSRQ measurement quantities (e.g., measResult) corresponding to any configured SCell, except any type-2 SCell(s), in a measResultSCell in the measResultServFreqList as described above.

The UE 102 may send 208 the measurement list. For example, the UE 102 may transmit the measurement list to an eNB 160 in an uplink message. For instance, the UE 102 may send a measResultPCell that includes RSRP and RSRQ measurement quantities of the PCell and a measResultServFreqList that includes RSRP and RSRQ measurement quantities for each serving cell, except for at least one type-2 SCell. In some implementations, the measResultPCell and the measResultServFreqList may be included in a MeasurementReport message.

Figure 3:
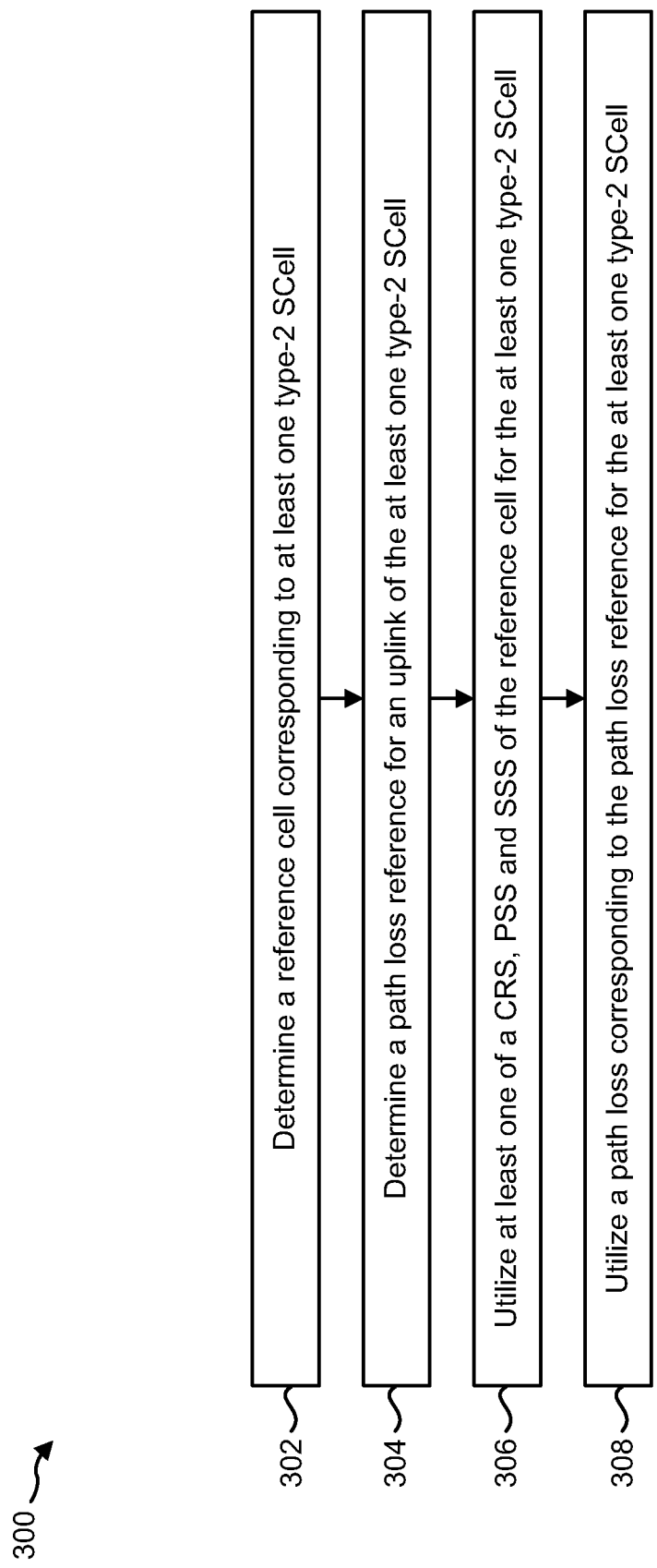
FIG. 3 is a flow diagram illustrating another configuration of a method for handling a type-2 carrier.

FIG. 3 is a flow diagram illustrating another configuration of a method 300 for handling a type-2 carrier. A UE 102 may determine 302 a reference cell corresponding to at least one type-2 SCell. For example, determining 302 a reference cell corresponding to the at least one type-2 SCell may include receiving a reference cell indicator (from an eNB 160, for instance). More specifically, a reference cell indicator may indicate a particular reference cell for a type-2 SCell. In some implementations, the reference cell may be designated with a reference cell indicator (e.g., a cell index number). For example, a UE 102 may be configured with multiple serving cells including a type-2 serving cell. When the UE 102 is configured (based on eNB 160 messaging, for example) with a type-2 SCell, the UE 102 may also be configured with a serving cell index for the type-2 SCell. The serving cell corresponding to the serving cell index may be determined 302 as the reference cell corresponding to the at least one type-2 SCell.

The UE 102 may determine 304 a path loss reference for an uplink of the at least one type-2 SCell. For example, the UE 102 may determine 304 the path loss reference in accordance with one or more of the approaches described above. In a first approach, the UE 102 determines 304 the path loss reference as the reference cell corresponding to the at least one type-2 SCell. In a second approach, the UE 102 determines 304 the path loss reference between a PCell and an SCell. In a third approach, the UE 102 determines 304 the path loss reference between a PCell and the reference cell corresponding to the at least one type-2 SCell. In some implementations, determining 304 the path loss reference is based on a received path loss reference indicator (from an eNB 160, for example). More detail is given below.

The UE 102 may utilize 306 at least one of a CRS, PSS and SSS of the reference cell for the at least one type-2 SCell. For example, the UE 102 may utilize one or more of the PSS and SSS to synchronize the type-2 SCell.

It should be noted that the UE 102 may additionally or alternatively utilize 308 a path loss corresponding to the path loss reference for the at least one type-2 SCell. As described above, the path loss reference may or may not be the reference cell.

It should be noted that the method 300 described in connection with FIG. 3 may be performed independently of the method 200 described in connection with FIG. 2. Alternatively, one or more aspects of the method 200 described in connection with FIG. 2 may be performed in conjunction with one or more aspects of the method 300 described in connection with FIG. 3.

Figure 4:
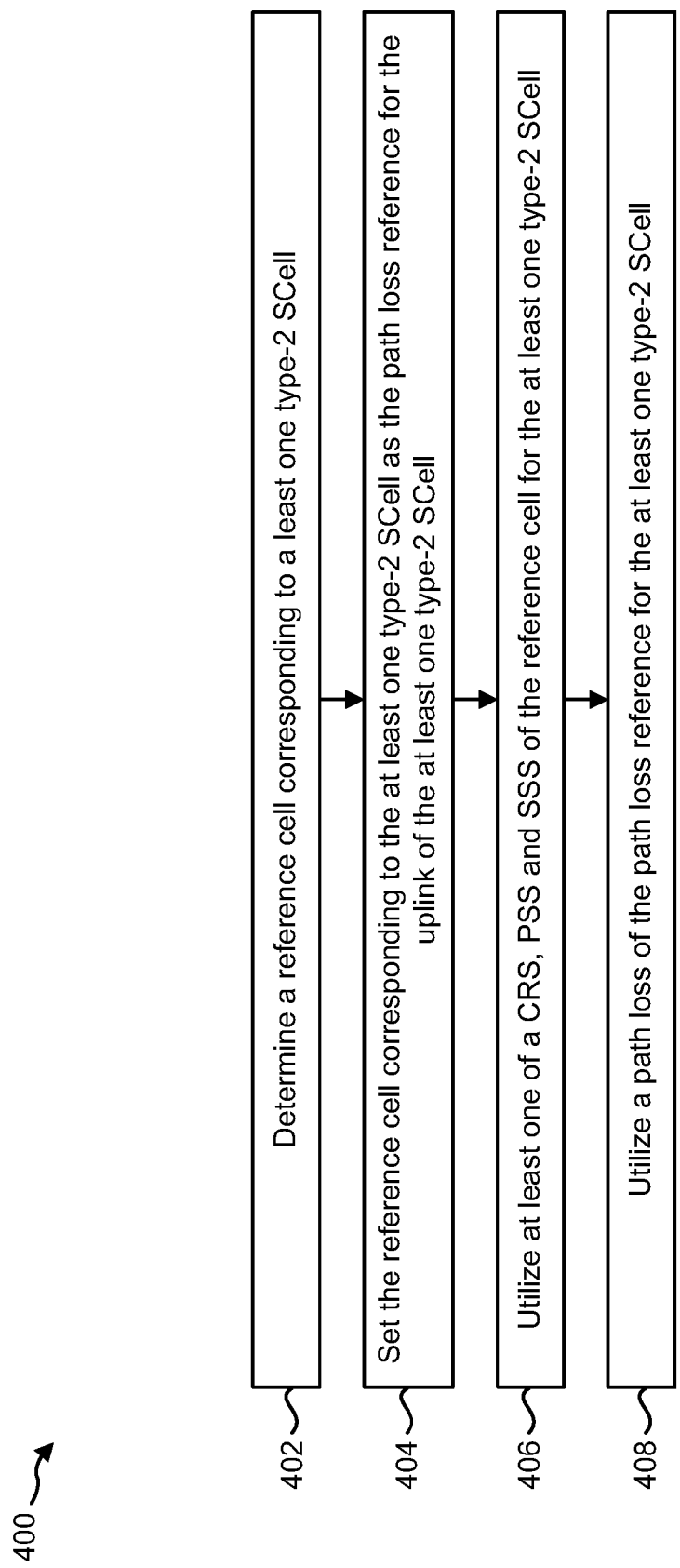
FIG. 4 is a flow diagram illustrating a more specific configuration of a method for handling a type-2 carrier.

FIG. 4 is a flow diagram illustrating a more specific configuration of a method 400 for handling a type-2 carrier. A UE 102 may determine 402 a reference cell corresponding to at least one type-2 SCell. This may be done as described in connection with FIG. 3 above.

The UE 102 may set 404 the reference cell corresponding to the at least one type-2 SCell as the path loss reference for the uplink of the at least one type-2 SCell. This is one example of the first approach described above. In this approach, the UE 102 determines the path loss reference as the reference cell corresponding to the at least one type-2 SCell.

The UE 102 may utilize 406 at least one of a CRS, PSS and SSS of the reference cell for the at least one type-2 SCell. This may be done as described in connection with FIG. 3 above.

It should be noted that the UE 102 may additionally or alternatively utilize 408 a path loss corresponding to the path loss reference for the at least one type-2 SCell. This may be done as described in connection with FIG. 3 above.

Figure 5:
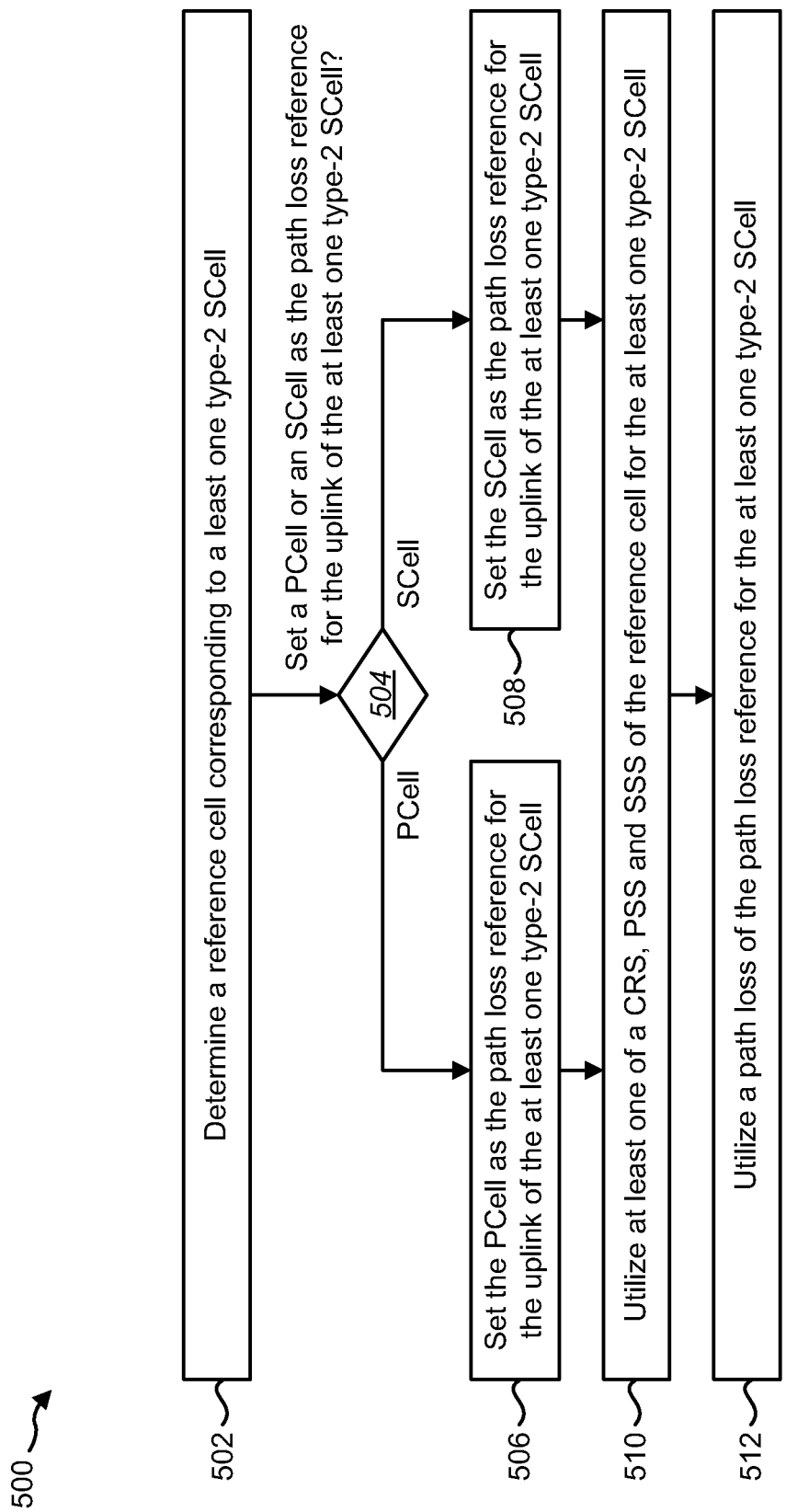
FIG. 5 is a flow diagram illustrating another more specific configuration of a method for handling a type-2 carrier.

FIG. 5 is a flow diagram illustrating another more specific configuration of a method 500 for handling a type-2 carrier. A UE 102 may determine 502 a reference cell corresponding to at least one type-2 SCell. This may be done as described in connection with FIG. 3 above.

The UE 102 may determine 504 whether to set a PCell or an SCell as the path loss reference for the uplink of the at least one type-2 SCell. For example, the UE 102 may receive a path loss reference indicator that indicates whether to set a PCell or an SCell as the path loss reference.

The UE 102 may set 506 the PCell as the path loss reference for the uplink of the at least one type-2 SCell if it is determined to set the PCell as the path loss reference. Alternatively, the UE 102 may set 508 the SCell as the path loss reference for the uplink of the at least one type-2 SCell if it is determined to set the SCell as the path loss reference. This is one example of the second approach described above.

The UE 102 may utilize 510 at least one of a CRS, PSS and SSS of the reference cell for the at least one type-2 SCell. This may be done as described in connection with FIG. 3 above.

It should be noted that the UE 102 may utilize 512 a path loss corresponding to the path loss reference for the at least one type-2 SCell. This may be done as described in connection with FIG. 3 above.

Figure 6:
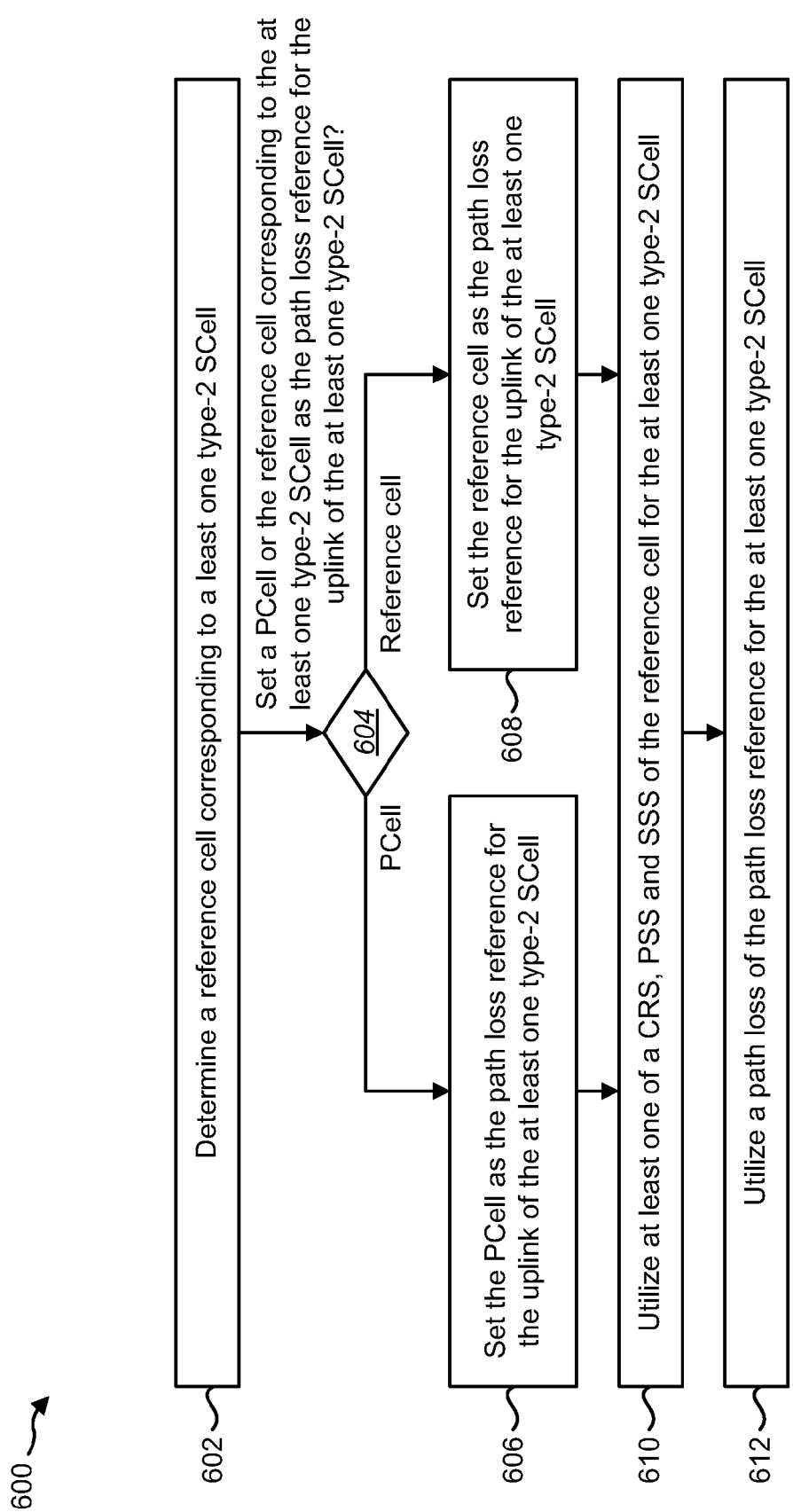
FIG. 6 is a flow diagram illustrating another more specific configuration of a method for handling a type-2 carrier.

FIG. 6 is a flow diagram illustrating another more specific configuration of a method 600 for handling a type-2 carrier. A UE 102 may determine 602 a reference cell corresponding to at least one type-2 SCell. This may be done as described in connection with FIG. 3 above.

The UE 102 may determine 604 whether to set a PCell or the reference cell corresponding to the at least one type-2 SCell as the path loss reference for the uplink of the at least one type-2 SCell. For example, the UE 102 may receive a path loss reference indicator that indicates whether to set a PCell or the reference cell as the path loss reference.

The UE 102 may set 606 the PCell as the path loss reference for the uplink of the at least one type-2 SCell if it is determined to set the PCell as the path loss reference. Alternatively, the UE 102 may set 608 the reference cell as the path loss reference for the uplink of the at least one type-2 SCell if it is determined to set the reference cell as the path loss reference. This is one example of the third approach described above.

The UE 102 may utilize 610 at least one of a CRS, PSS and SSS of the reference cell for the at least one type-2 SCell. This may be done as described in connection with FIG. 3 above.

It should be noted that the UE 102 may utilize 612 a path loss corresponding to the path loss reference for the at least one type-2 SCell. This may be done as described in connection with FIG. 3 above.

Figure 7:
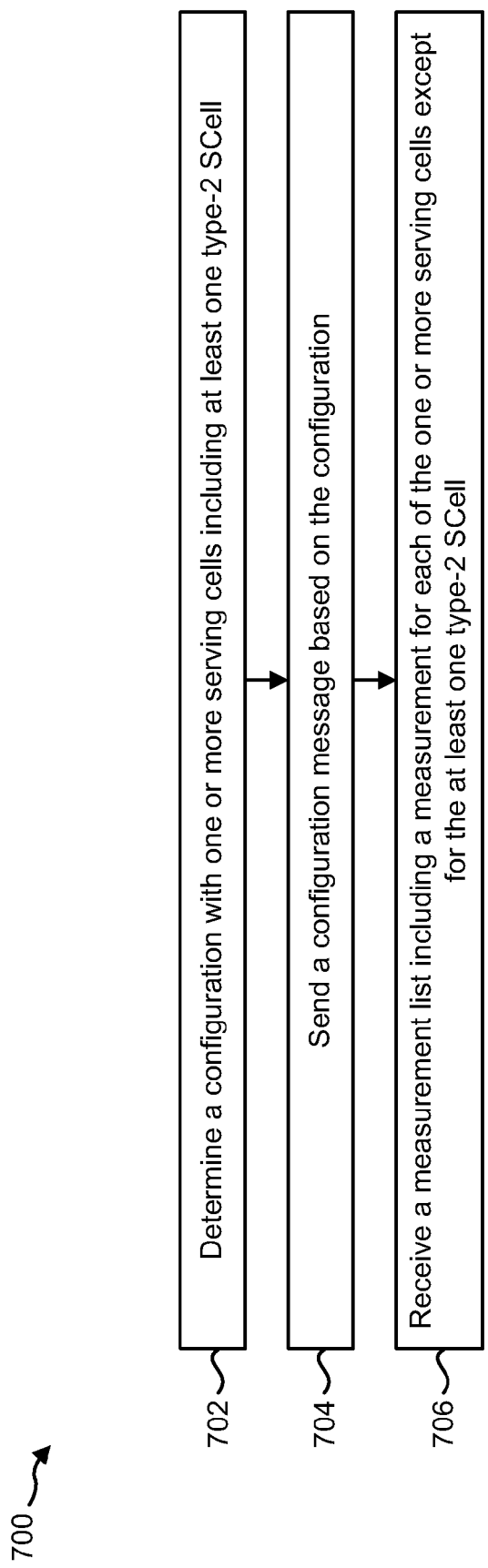
FIG. 7 is a flow diagram illustrating another configuration of a method for handling a type-2 carrier.

FIG. 7 is a flow diagram illustrating another configuration of a method 700 for handling a type-2 carrier. An eNB 160 may determine 702 a configuration with one or more serving cells including at least one type-2 SCell. For example, the eNB 160 may generate a configuration for a UE 102 to communicate on multiple carriers 119, where at least one of the multiple carriers 119 is a type-2 carrier provided in an SCell.

The eNB 160 may send 704 a configuration message based on the configuration. For example, the eNB 160 may generate and send 704 a configuration message indicating the configuration with one or more serving cells including at least one type-2 SCell.

In some implementations, the eNB 160 may generate and send a measConfig. For example, the measConfig may be sent in an RRCConnectionReconfiguration message. The measConfig may direct the UE 102 to obtain a measurement (e.g., RSRP and RSRQ) for one or more serving sells that are not type-2 SCells.

The eNB 160 may receive 706 a measurement list including a measurement for each of the one or more serving cells except for the at least one type-2 SCell. For example, the eNB 160 may receive a measResultPCell and a measResultServFreqList that includes RSRP and RSRQ quantities for one or more serving cells, but does not include any measurement regarding a type-2 SCell. In some implementations, the eNB 160 may receive 706 the measurement list (e.g., measResultPCell, measResultServFreqList) as measResults within a MeasurementReport message.

Figure 8:
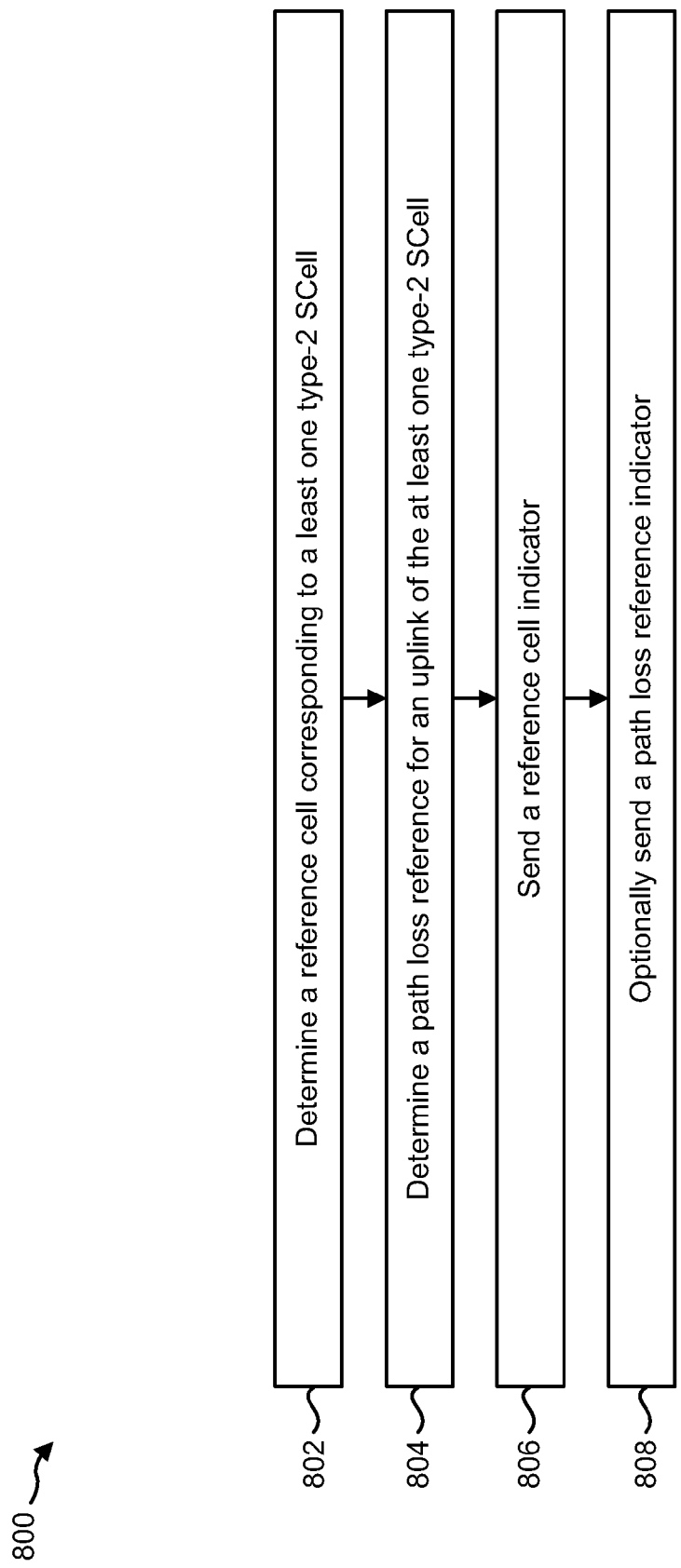
FIG. 8 is a flow diagram illustrating another configuration of a method for handling a type-2 carrier.

FIG. 8 is a flow diagram illustrating another configuration of a method 800 for handling a type-2 carrier. An eNB 160 may determine 802 a reference cell corresponding to at least one type-2 SCell. For example, the eNB 160 may select a serving cell that is configured for communication with a UE 102 as a reference cell. The reference cell may be utilized by a UE 102 for operations relating to the at least one type-2

SCell. For example, the reference cell may include one or more of a CRS, PSS and SSS, which the UE 102 may utilize for one or more operations relating to the type-2 SCell.

The eNB 160 may determine 804 a path loss reference for an uplink of the least one type-2 SCell. For example, the eNB 160 may determine 804 the path loss reference in accordance with one or more of the approaches described above. In a first approach, the path loss reference is the reference cell corresponding to the at least one type-2 SCell. In a second approach, the eNB 160 may select the path loss reference between a PCell and an SCell. In a third approach, the eNB 160 may select the path loss reference between a PCell and the reference cell corresponding to the at least one type-2 SCell.

The eNB 160 may send 806 a reference cell indicator. For example, the eNB 160 may send 806 a reference cell indicator that indicates a reference cell to a UE 102. More specifically, a reference cell indicator may indicate a particular reference cell for a type-2 SCell. In some implementations, the reference cell indicator may be a cell index number. For example, a eNB 160 may configure a UE 102 with multiple serving cells including a type-2 serving cell. When the eNB 160 configures a UE 102 (based on eNB 160 messaging, for example) with a type-2 SCell, the eNB 160 may also configure the UE 102 with a serving cell index for the type-2 SCell. The serving cell corresponding to the serving cell index may be the reference cell corresponding to the at least one type-2 SCell.

The eNB 160 may optionally send 808 a path loss reference indicator. In a first approach, the path loss reference may be the reference cell. In this case, the eNB 160 may not send a path loss reference indicator. Optionally, however, the eNB 160 may send a path loss reference indicator that indicates a selected path loss reference. In a second approach, for example, the eNB 160 may select a path loss reference between a PCell and an SCell. In this case, the eNB 160 may send a path loss reference indicator indicating whether the path loss reference is a PCell or an SCell. In a third approach, the eNB 160 may select a path loss reference between a PCell and the reference cell. In this case, the eNB 160 may send a path loss reference indicator indicating whether the path loss reference is a PCell or the reference cell.

Figure 9:
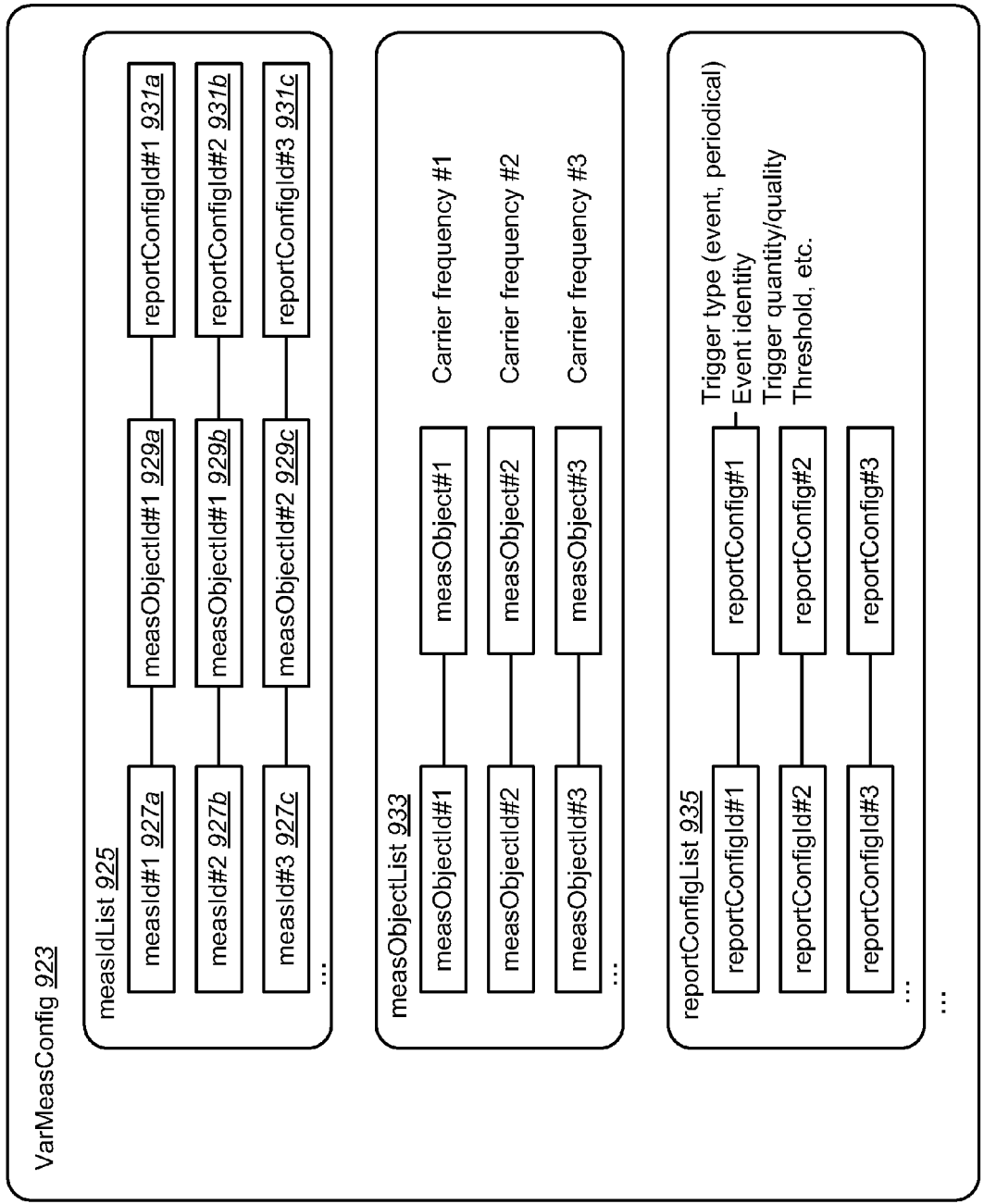
FIG. 9 is a block diagram illustrating an example of the structure of a measurement configuration variable.

FIG. 9 is a block diagram illustrating an example of the structure of a measurement configuration variable 923. The measurement configuration variable 923 may be referred to as VarMeasConfig. The measurement configuration variable 923 may be one example of the UE variable VarMeasConfig described above. Both the UE 102 and the eNB 160 may maintain the measurement configuration variable 923. The measurement configuration variable 923 may include a list of measurement identities (measIdList) 925a-c, a list of measurement objects (measObjectList) 933 and a list of report configurations (reportConfigList) 935, which may be examples of corresponding elements described above. The list of measurement identities 925 may include one or more measurement identities (e.g., measIds) 927a-c, one or more measurement object identities 929a-c and one or more report configuration identities 931a-c, which may be examples of corresponding elements described above. Each measurement identity 927 may be linked to a measurement object identity 929 and a report configuration identity 931.

In Release-10, measurement identity addition and modification procedures may be performed during radio resource control (RRC) connection reconfiguration if the RRCConnectionReconfiguration message includes the measConfig and the received measConfig includes the measIdToAddModList. The UE 102 may perform the measurement identity addition and modification procedures for each measId 927 included in a received measIdToAddModList. If an entry with the matching measId 927 exists in the measIdList 925 within the VarMeasConfig 923, the UE 102 may replace the entry with the value received for the measId 927. Otherwise, the UE 102 may add a new entry for this measId 927 within the VarMeasConfig 923. The eNB 160 may consider or assume that the addition or modification procedure has been done in the UE 102.

Figure 10:
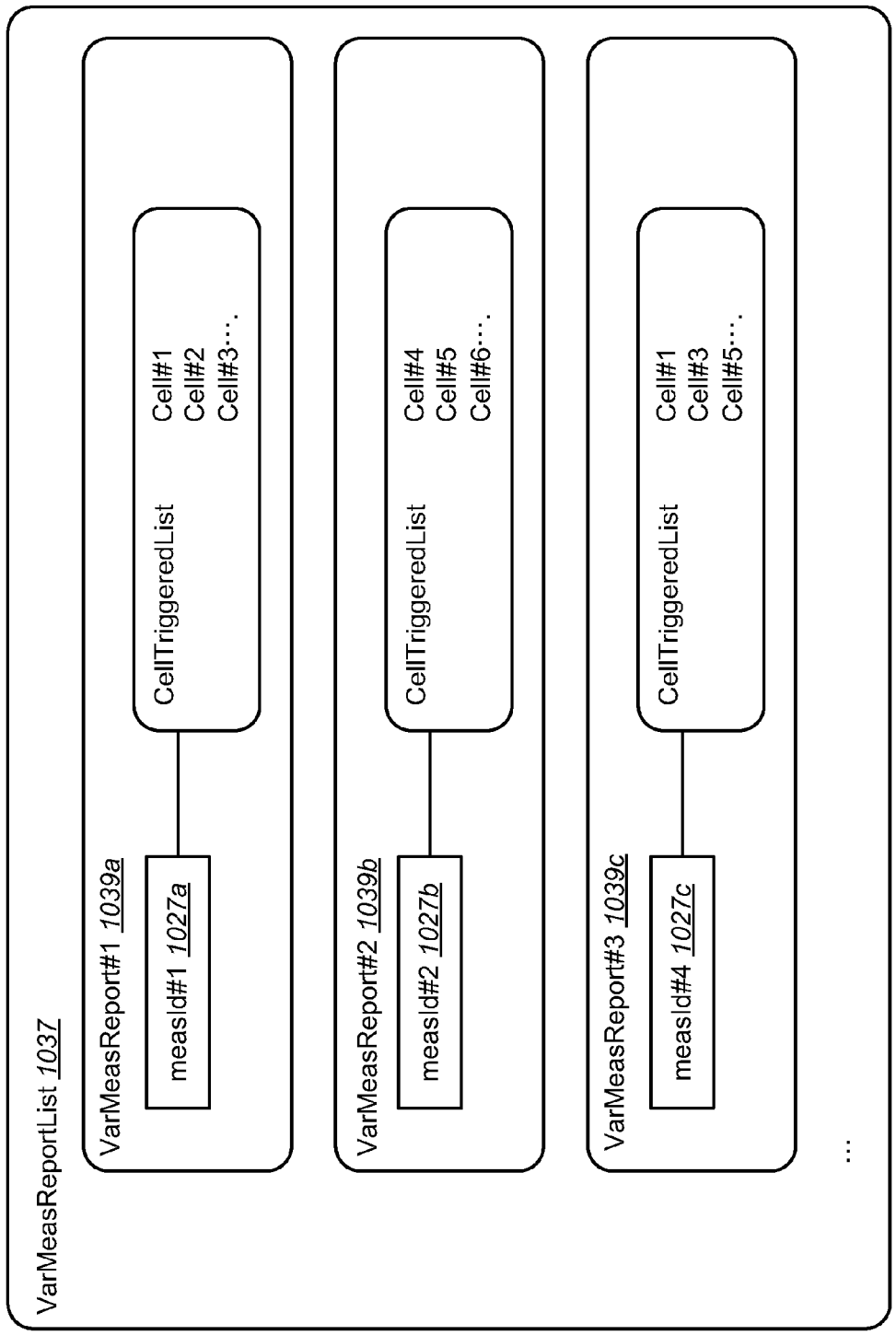
FIG. 10 is a block diagram illustrating one example of the structure of a measurement report list.

FIG. 10 is a block diagram illustrating one example of the structure of a measurement report list 1037. The measurement report list 1037 may be referred to as VarMeasReportList and may be one example of the corresponding element described above. Both the UE 102 and the eNB 160 may maintain the measurement report list 1037. The measurement report list 1037 may include multiple measurement reports 1039a-c. Each measurement report 1039 may include the measurement identity (measId) 1027a-c and the list of cells that triggered the measurement report 1039.

Figure 11:
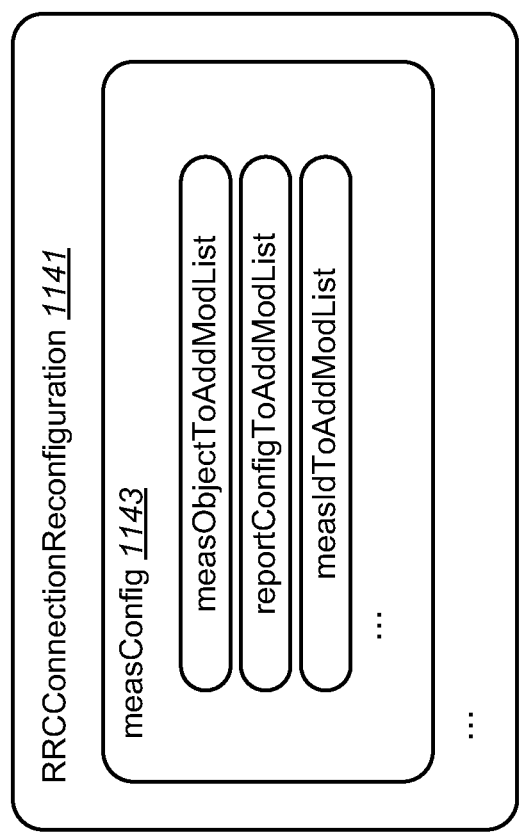
FIG. 11 is a block diagram illustrating an Radio Resource Control (RRC) Connection Reconfiguration message structure.

FIG. 11 is a block diagram illustrating an RRC Connection Reconfiguration message 1141 structure. The RRC Connection Reconfiguration message 1141 may be referred to as RRCConnectionReconfiguration and may be one example of the RRCConnectionReconfiguration message described above. The RRC Connection Reconfiguration message 1141 may include measurement configurations (measConfigs) 1143, which may be examples of the MeasConfig described above. The measurement configurations 1143 may include one or more of a measObjectToAddModList, a reportConfigToAddModList and a measIdToAddModList as described above. It should be noted that the RRC Connection Reconfiguration may include other elements.

Figure 12:
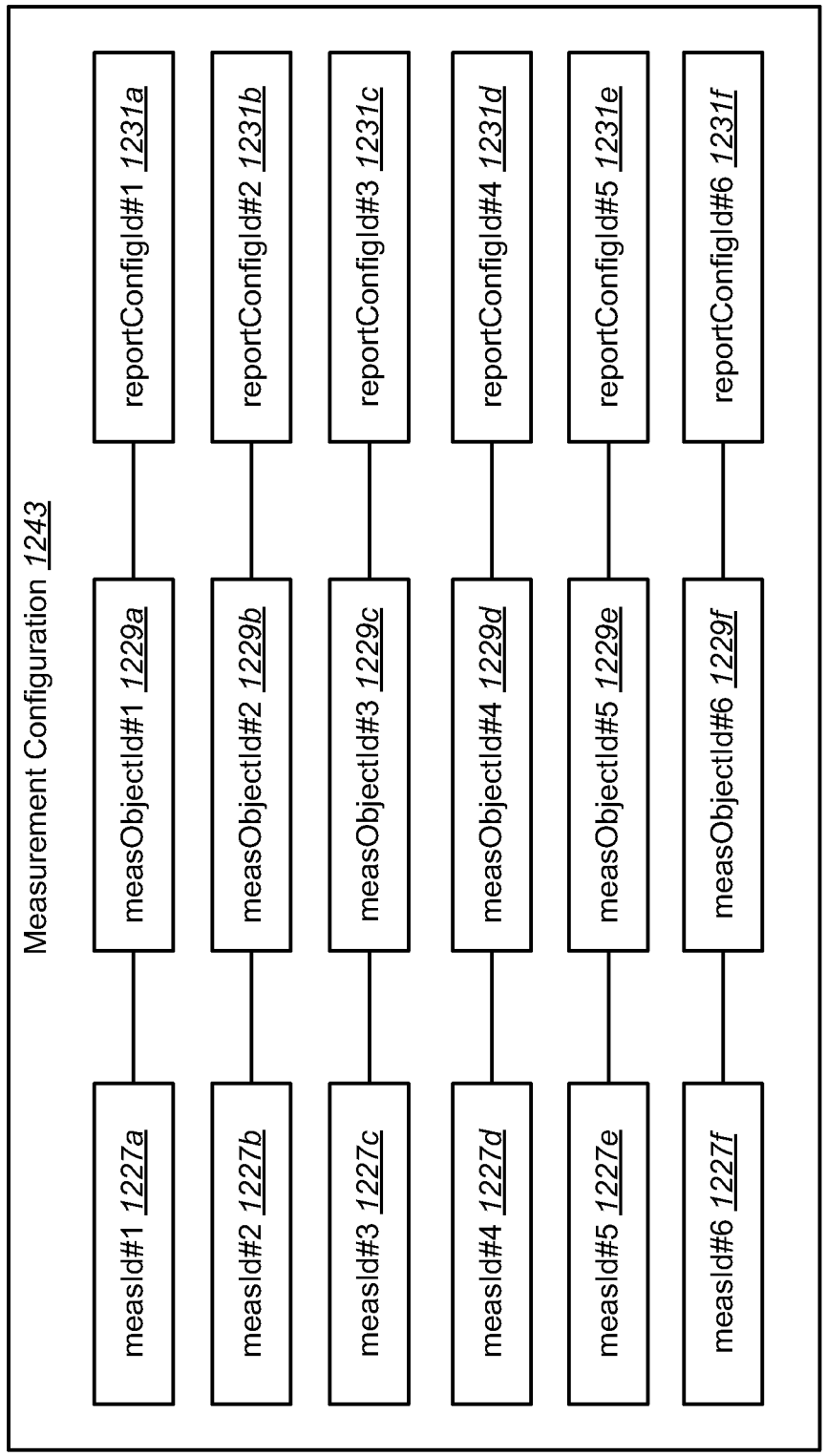
FIG. 12 is a block diagram illustrating an example of a measurement configuration (measConfig)

FIG. 12 is a block diagram illustrating an example of a measurement configuration (measConfig) 1243. The measurement configuration (measConfig) 1243 is one example of a measConfig described above that may be transmitted from an eNB 160 to a UE 102. The measurement configuration 1243 includes several measurement identities (measIds) 1227a-f, associated measurement object identities (measObjectIds) 1229a-f and associated report configuration identities (reportConfigIds) 1231a-f, which may be examples of corresponding elements described above. The measurement configuration 1243 may instruct the UE 102 to take RSRP and RSRQ measurements for one or more carriers (e.g., measObjects).

A measId 1227 may correspond to cell-specific reference signal (CRS) based radio resource management (RRM) measurements. When a measId 1227 is signaled, the measId 1227 may be associated with a measObjectId 1229a-f and a reportConfigId 1231a-f.

In some implementations, the measurement configuration 1243 may specify criteria for triggering a measurement reporting event. An event identity may identify measurement reporting events (i.e., the current list of events A1-A6 described above). Events A1-A6 are defined as events based on measurement results of a cell-specific reference signal (CRS) (of a reference cell for a type-2 SCell, for example).

In Release-10, a measurement identity addition/modification procedure may be performed during a radio resource control (RRC) connection reconfiguration procedure. Specifically, an addition/modification procedure may be performed during radio resource control (RRC) connection reconfiguration if the RRCConnectionReconfiguration message 1141 includes the measurement configuration 1143, 1243 and the received measurement configuration 1143, 1243 includes the measIdToAddModList.

Figure 13:
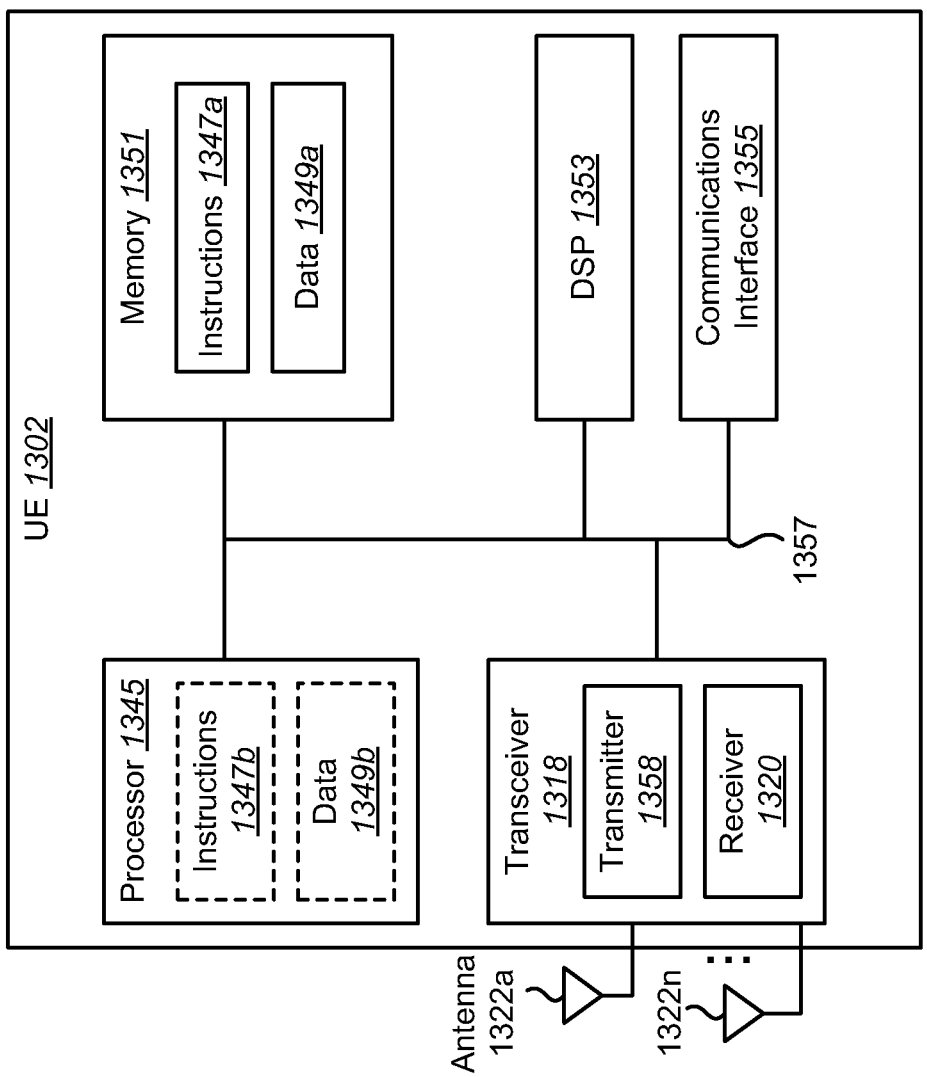
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1345 that controls operation of the UE 1302. The processor 1345 may also be referred to as a central processing unit (CPU). Memory 1351, which may include read-only memory (ROM), random access memory (RAM), a combination of the two or any type of device that may store information, provides instructions 1347a and data 1349a to the processor 1345. A portion of the memory 1351 may also include non-volatile random access memory (NVRAM). Instructions 1347b and data 1349b may also reside in the processor 1345. Instructions 1347b and/or data 1349b loaded into the processor 1345 may also include instructions 1347a and/or data 1349a from memory 1351 that were loaded for execution or processing by the processor 1345. The instructions 1347b may be executed by the processor 1345 to implement one or more of the methods 200, 300, 400, 500, 600 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1357, which may include a power bus, a control signal bus and a status signal bus, in addition to a data bus. However, for the sake of clarity, the various buses are illustrated in FIG. 13 as the bus system 1357. The UE 1302 may also include a digital signal processor (DSP) 1353 for use in processing signals. The UE 1302 may also include a communications interface 1355 that provides user access to the functions of the UE 1302. The UE 1302 illustrated in FIG. 13 is a functional block diagram rather than a listing of specific components.

Figure 14:
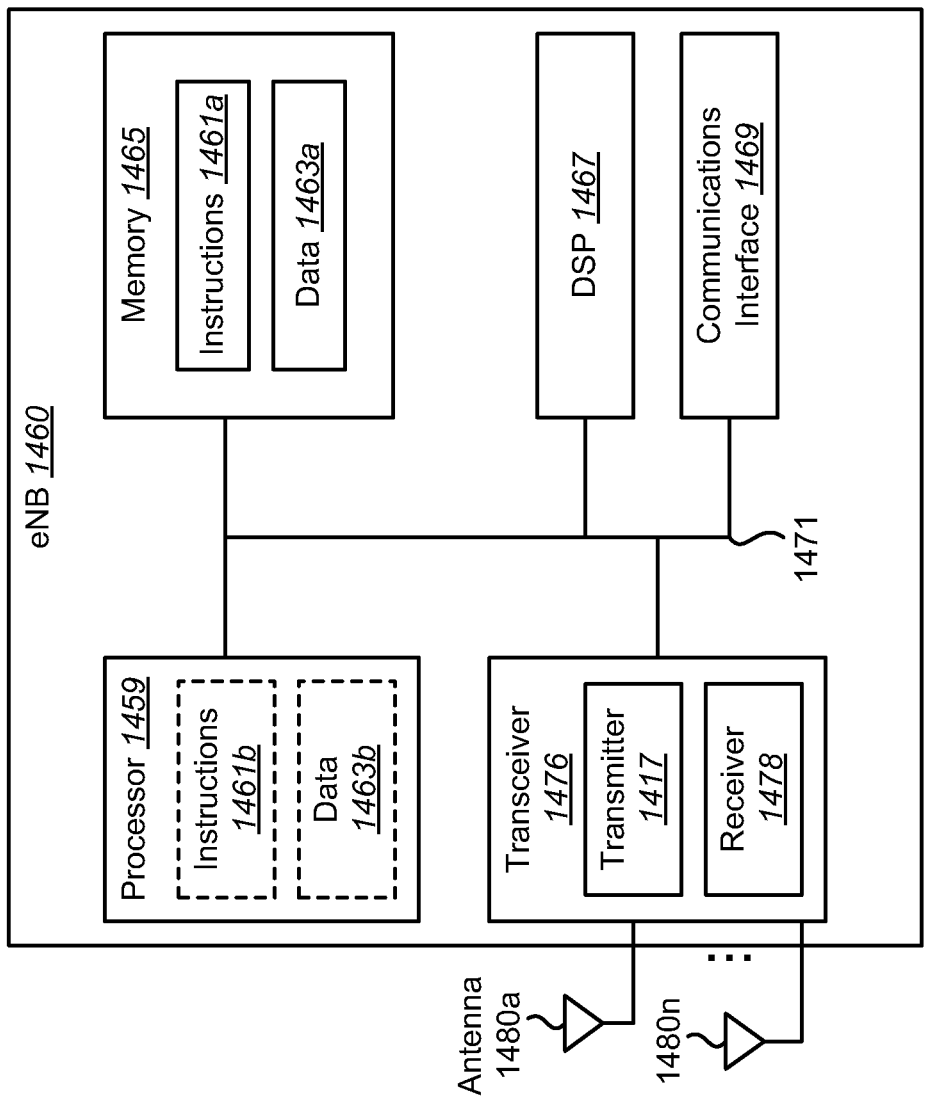
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1459 that controls operation of the eNB 1460. The processor 1459 may also be referred to as a central processing unit (CPU). Memory 1465, which may include read-only memory (ROM), random access memory (RAM), a combination of the two or any type of device that may store information, provides instructions 1461a and data 1463a to the processor 1459. A portion of the memory 1465 may also include non-volatile random access memory (NVRAM). Instructions 1461b and data 1463b may also reside in the processor 1459. Instructions 1461b and/or data 1463b loaded into the processor 1459 may also include instructions 1461a and/or data 1463a from memory 1465 that were loaded for execution or processing by the processor 1459. The instructions 1461b may be executed by the processor 1459 to implement one or more of the methods 700, 800 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the eNB 1460 are coupled together by a bus system 1471, which may include a power bus, a control signal bus and a status signal bus, in addition to a data bus. However, for the sake of clarity, the various buses are illustrated in FIG. 14 as the bus system 1471. The eNB 1460 may also include a digital signal processor (DSP) 1467 for use in processing signals. The eNB 1460 may also include a communications interface 1469 that provides user access to the functions of the eNB 1460. The eNB 1460 illustrated in FIG. 14 is a functional block diagram rather than a listing of specific components.

Figure 15:
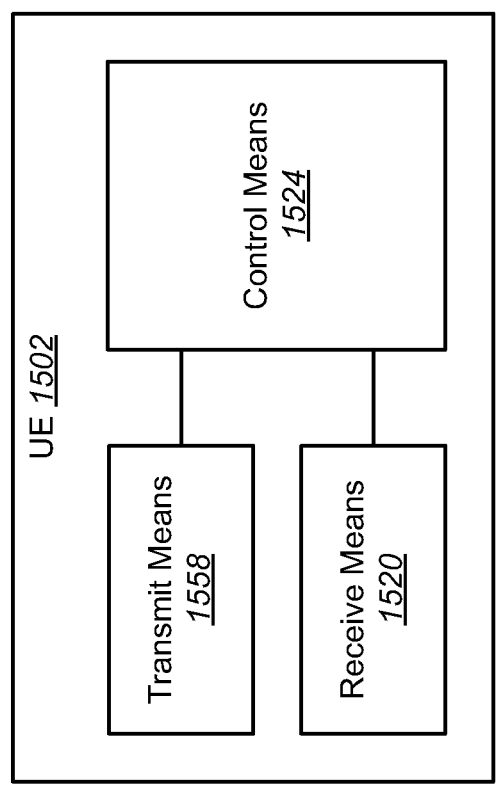
FIG. 15 is a block diagram illustrating one configuration of a UE in which systems and methods for handling a type-2 carrier may be implemented.

FIG. 15 is a block diagram illustrating one configuration of a UE 1502 in which systems and methods for handling a type-2 carrier may be implemented. The UE 1502 includes transmit means 1558, receive means 1520 and control means 1524. The transmit means 1558, receive means 1520 and control means 1524 may be configured to perform one or more of the functions described in connection with FIGS. 2-6 and FIG. 13 above. FIG. 13 above illustrates one example of a concrete apparatus structure of FIG. 15. Other various structures may be implemented to realize one or more of the functions of FIGS. 2-6 and FIG. 13. For example, a DSP may be realized by software.

Figure 16:
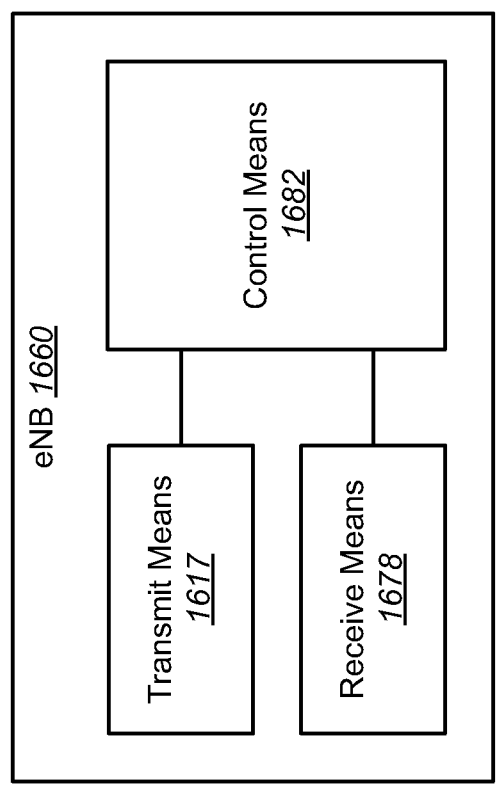
FIG. 16 is a block diagram illustrating one configuration of an eNB in which systems and methods for handling a type-2 carrier may be implemented.

FIG. 16 is a block diagram illustrating one configuration of an eNB 1660 in which systems and methods for handling a type-2 carrier may be implemented. The eNB 1660 includes transmit means 1617, receive means 1678 and control means 1682. The transmit means 1617, receive means 1678 and control means 1682 may be configured to perform one or more of the functions described in connection with FIGS. 7-8 FIG. 14 above. FIG. 14 above illustrates one example of a concrete apparatus structure of FIG. 16. Other various structures may be implemented to realize one or more of the functions of FIGS. 7-8 and FIG. 14. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) for handling a type-2 carrier, comprising:
   a processor;
   memory in electronic communication with the processor, wherein instructions stored in the memory are executable to:
   apply a configuration with one or more serving cells including at least one type-2 secondary cell (SCell);
   obtain a measurement for each of the one or more serving cells except for the at least one type-2 SCell;
   set a measurement list to include measurement results for the one or more serving cells except for the at least one type-2 SCell, wherein the measurement results for the one or more serving cells are included in a case that the one or more SCells that are not type-2 are configured;
   send the measurement list; and
   determine a path loss reference for an uplink of the at least one type-2 SCell, wherein determining the path loss reference comprises determining whether to set a primary cell (PCell) or a secondary cell (SCell) as the path loss reference for the uplink of the at least one type-2 SCell.

2. A User Equipment (UE) for handling a type-2 carrier, comprising:
   a processor;
   memory in electronic communication with the processor, wherein instructions stored in the memory are executable to:
   apply a configuration with one or more serving cells including at least one type-2 secondary cell (SCell);
   obtain a measurement for each of the one or more serving cells except for the at least one type-2 SCell;
   set a measurement list to include measurement results for the one or more serving cells except for the at least one type-2 SCell, wherein the measurement results for the one or more serving cells are included in a case that the one or more SCells that are not type-2 are configured;
   send the measurement list; and
   determine a path loss reference for an uplink of the at least one type-2 SCell, wherein determining the path loss reference comprises determining whether to set a primary cell (PCell) or a reference cell corresponding to the at least one type-2 SCell as the path loss reference for the uplink of the at least one type-2 SCell.

3. A method for handling a type-2 carrier by a User Equipment (UE), comprising:
   applying a configuration with one or more serving cells including at least one type-2 secondary cell (SCell);
   obtaining a measurement for each of the one or more serving cells except for the at least one type-2 SCell;
   setting a measurement list to include the measurement results for the one or more serving cells except for the at least one type-2 SCell, wherein the measurement results for the one or more serving cells are included in a case that the one or more SCells that are not type-2 are configured;
   sending the measurement list; and
   determining a path loss reference for an uplink of the at least one type-2 SCell, wherein determining the path loss reference comprises determining whether to set a primary cell (PCell) or a secondary cell (SCell) as the path loss reference for the uplink of the at least one type-2 SCell.

4. A method for handling a type-2 carrier by a User Equipment (UE), comprising:
   applying a configuration with one or more serving cells including at least one type-2 secondary cell (SCell);
   obtaining a measurement for each of the one or more serving cells except for the at least one type-2 SCell;
   setting a measurement list to include the measurement results for the one or more serving cells except for the at least one type-2 SCell, wherein the measurement results for the one or more serving cells are included in a case that the one or more SCells that are not type-2 are configured;
   sending the measurement list and
   determining a path loss reference for an uplink of the at least one type-2 SCell, wherein determining the path loss reference comprises determining whether to set a primary cell (PCell) or a reference cell corresponding to the at least one type-2 SCell as the path loss reference for the uplink of the at least one type-2 SCell.

* * * * *